United States Patent
Brooks

(10) Patent No.: US 6,981,045 B1
(45) Date of Patent: Dec. 27, 2005

(54) SYSTEM FOR REDIRECTING REQUESTS FOR DATA TO SERVERS HAVING SUFFICIENT PROCESSING POWER TO TRANSCAST STREAMS OF DATA IN A DESIRED FORMAT

(75) Inventor: Roger K. Brooks, Palo Alto, CA (US)

(73) Assignee: Vidiator Enterprises Inc., Nassau (BS)

( * ) Notice: Subject to any disclaimer, the term of this patent is extended or adjusted under 35 U.S.C. 154(b) by 696 days.

(21) Appl. No.: 09/789,715

(22) Filed: Feb. 20, 2001

Related U.S. Application Data

(60) Provisional application No. 60/157,468, filed on Oct. 1, 1999, provisional application No. 60/170,079, filed on Dec. 9, 1999, provisional application No. 60/183,637, filed on Feb. 18, 2000, provisional application No. 60/183,636, filed on Feb. 18, 2000, provisional application No. 60/183,625, filed on Feb. 18, 2000, provisional application No. 60/183,631, filed on Feb. 18, 2000.

(51) Int. Cl.[7] .......................................... G06F 15/173
(52) U.S. Cl. ................................. 709/226; 709/246
(58) Field of Search ............................... 709/231, 226, 709/246; 370/436

(56) References Cited

U.S. PATENT DOCUMENTS

| | | | |
|---|---|---|---|
| 5,793,980 A | * | 8/1998 | Glaser et al. ............... 709/231 |
| 5,996,022 A | * | 11/1999 | Krueger et al. ............ 709/247 |
| 6,594,699 B1 | * | 7/2003 | Sahai et al. ................ 709/228 |

* cited by examiner

*Primary Examiner*—Le Hien Luu
(74) *Attorney, Agent, or Firm*—Seed IP Law Group PLLC

(57) ABSTRACT

A method includes polling a first plurality of one-hop gateway serves for available bandwidth and available number of CPU cycles for each respective one-hop gateway server, receiving a request to provide data to a media sink in a desired format, determining a bandwidth requirement and an estimated number of CPU cycles required for servicing the media sink, determining a second plurality of one-hop gateway servers having an available bandwidth greater or equal to the bandwidth requirement and an available number of CPU cycles greater or equal to the estimated number of CPU cycles, determining a one-hop gateway server from the second plurality of one-hop gateway servers appropriate for providing the data to the media sink and configured to receive data in a second format, and transcoding the data from a first format to the second format. An example gateway server and a computer program product usable therewith are also provided.

20 Claims, 15 Drawing Sheets

SYSTEM FOR REDIRECTING REQUESTS FOR DATA TO SERVERS HAVING SUFFICIENT PROCESSING POWER TO TRANSCAST STREAMS OF DATA IN A DESIRED FORMAT

CROSS-REFERENCES TO RELATED APPLICATIONS

The present invention disclosure claims priority to Provisional U.S. Patent Application No. 60/157,468, filed Oct. 1, 1999, entitled Internet Camera Video Producer and Provisional U.S. Patent Application No. 60/170,079, filed Dec. 09, 1999, entitled Personal Broadcasting System. The present invention disclosure also claims priority to Provisional U.S. Patent Application No. 60/183,637, filed Feb. 18, 2000, entitled System Wide Client Server Load Balancing Method and apparatus. The present invention claims priority to the Provisional U.S. Application No. 60/183,636, filed Feb. 18, 2000 entitled Method and Apparatus for Transcasting Streaming Media. The present invention claims priority to the Nonprovisional U.S. patent application Ser. No. 09/539,432 filed Mar. 30, 2000 entitled Video Data Stream Redirection Apparatus. The present invention claims priority to the Provisional U.S. Application No. 60/183,625 filed Feb. 18, 2000 entitled Intelligent networked video processing & distribution. The present invention claims priority to the Provisional U.S. Application No. 60/183,631 filed Feb. 18, 2000 entitled Real-time multiple Video Stream Transcoding Method and System. These applications are herein by incorporated by reference for all purposes.

BACKGROUND OF THE INVENTION

The present invention relates to methods for video redirection across a computer network. In particular, the present invention relates to techniques for redirecting requests for video streams to servers having sufficient processing power to transcast streams of video data.

The legend of the Tower of Babel tells us that humans once spoke a common language. However, divine intervention soon foiled human's plans in the building of the tower to the sky. This was done by making humans speak in different languages. As a result, the legend goes, humans did not understand each other, humans misunderstood others' intentions, and ultimately humans moved away from each other. Ever since that day, humans have been benefited and plagued by language and cultural differences.

Translating between different languages has also been an issue considered in popular fiction. In Douglas Adam's well-known Hitchhiker's Guide to the Galaxy (1979), the problem of different languages was solved by the introduction of a "Babel fish." Adams described the Babel fish as a "small, yellow and leechlike, and probably the oddest thing in the Universe. It feeds on the brainwave energy received not from its own carrier but from those around it. It absorbs all unconscious mental frequencies from this brainwave energy to nourish itself with. It then excretes into the mind of its carrier a telepathic matrix formed by combining the conscious thought frequencies with nerve signals picked up from the speech centers of the brain which has supplied them. The practical upshot of all this is that if you stick a Babel fish in your ear you can instantly understand anything said to you in any form of language." While this, of course, may not really exist, a commercial translation service has actually been named after the Babel fish.

On the Internet, Altavista.com provides a translation service that translates text in a web page from one selected language to another selected language. The tool is called the "Babel fish." To use this tool, the user enters a web address and then specifies the language direction, e.g. English to French. In response, the Babel fish will translate the text that appears on the page into the new language, all other aspects of the page will remain the same. The quality of the translations may vary with actual usage. For example, translating the phrase "To jump the gun" to French and back into English returns the phrase "To connect the gun." As can be seen, the quality of such services are not quite ideal. Further, such services do not address non-text data such as audio and visual (media) data.

On the web, other types of data than text are also displayed to users. Such data include media such as images, sounds, video, and the like. With such data, instead of being in different languages, the data are stored and transmitted into different formats. Most of the different media formats are incompatible. Currently, there are a multitude of standards or formats for each of them, for example, images may be transmitted in formats including *.jpg, *.gif, *.bmp, *.pcx, and the like; sounds may be transmitted in formats including *.wav, *.mp3, *.aiff, and the like; and video may be transmitted in formats including *.avi, *.mov, *.rm, *.mpg, *.asf, vivo and the like.

To view or hear data in any of the above media formats requires an appropriate viewing (translation) application program. That is, an application program is required to decode the transmitted data and output the data to the computer of the requester. The requesting computer must have preinstalled many different viewer applications. This is so that the computer can receive, decode, and display data stored in the many different media formats.

One drawback to requiring multiple viewers is that this solution is not appropriate for all devices connected to the web. In particular, it is not appropriate for future wireless devices, or the like. Such devices may include cellular telephones, wireless PDAs, network appliances (refrigerators, toasters, ovens, smart houses), wrist watches, wearable computers, and the like. Because many of these devices will have lower amounts of memory and performance compared to desk top computers, these devices will not be able to display a large number of viewers. As a result, these devices will not be able to play many different media formats.

One solution proposed to address this problem has been to standardize upon one particular format. For example, all wireless devices in the future would be able to receive and output data stored in one particular media format, such as MPEG-4 (Motion Pictures Expert Group), or the like.

A drawback to this solution is that in theory, this solution is reasonable, however, in practice, it is not likely to happen. The primary reason is that there are many competing media formats available, and most are backed by separate companies. For example, Windows pushes the *avi media format, Apple pushes the *.mov media format, Real Networks pushes the *.rm format, Vivo Software pushes its own format, and the like. It is doubtful that such companies will agree on a single media format.

Another drawback is that even if there is one standardized media format, different requesting devices will have different performance, resolutions, bandwidth, and the like. For example, a PDA may have the ability to display 80×60 pixel 24-bit color images, however a wrist watch may have the ability to display only 40×30 pixel 8-bit gray scale images, and the like. Because many future wireless network devices or appliances will have different performance, bandwidth, and the like, the source of the media will have to store the data in just as many data files. For example, if there are 100 different telephones with web access, each telephone with its own performance, bandwidth factors, and the like, to support all these telephones the media source will have to store the data in 100 different data files. This is highly inefficient and/or impractical to implement, not to mention impossible for live data.

Typically, media sources, such as web sites, provide only a limited number of media formats and performance characteristics. For example, a typical site may only offer a media clip in the Quicktime format at 320×240 resolution or 160×120 resolution. If a requesting device cannot process Quicktime format, the user is out of luck. As another example, if the requesting device can only play 80×60 resolution Quicktime movies, the media source is wasting its output bandwidth sending the requesting device 160×120 resolution Quicktime movies.

Thus what is needed in the industry are improved methods for redirecting requests for video data to servers that provide requesting devices with media in the format and performance appropriate and/or requested for these requesting devices.

SUMMARY OF THE INVENTION

The present invention relates to methods for redirecting, transcoding and transforming video streams. In particular, the present invention relates to techniques for directing requests for video data streams to servers that have sufficient processing power to transcast streams of data. The severs may transcast streams of data to a client, or to other servers for further transcasting.

Apparatus and techniques are described for the efficient distribution of streaming media between multiple clients through one or more networked gateways. The compression formats, display resolutions, frame rates, bandwidths, etc. requested can differ from one client to another client. The techniques automatically transforms the streams to meet the needs of the clients. Furthermore, the techniques reduce the processing bandwidths over the distribution network. These techniques are performed on gateway servers on the fly by dynamically generating network topologies between the data's sources, sinks and gateways. These topologies are typically "self-creating" and do not need to be managed by any agents or centralized monitor. The techniques optimize delivery of multimedia contents by optimizing the bandwidth required to deliver such content to a multitude of consumers with different format requirements for the content. This works by collapsing redundant information transfers into a single stream of information wherever possible.

The present invention solves this problem through the use of a technique termed "Trans-cast". This is a new approach to the delivery of media information wherein the delivery of media content is optimized on the information layer. Two important aspects are the use of transcoding gateways and dynamically generated multi-cast architectures.

An ideal solution for the successful distribution of streaming media to diverse clients is the strategic deployment of transcoding servers or gateways throughout the network. In the present embodiment, such transcoding gateways allow for one type of media content to be transformed into a multitude of other formats; for example, MPEG-1 to MPEG-4, 640×480 video to 80×60, CD quality audio to ACELP.

Herein, transcasting refers to deliver of the same information or the same media content a reduced number of times using the a reduced network bandwidth. A gateway close to the source transcodes the incoming stream into a format to be modified by later gateways in order to support all of the media consumers. This two gateway component path can itself be split in to smaller units with more gateways in order to support the full diversity of the clients while reducing both CPU and bandwidth requirements. These intermediary gateways simultaneously act as clients and servers of transcoded media. In this fashion, a more optimal bandwidth utilization of network and processing requirements of the gateways, media sources and sinks can be achieved.

With these gateways in tact, the bandwidth consumption of the delivery of media content becomes drastically optimized. If producer A wants to deliver content to consumers B, C and D, the media content will be delivered in lowest common multiple format (in terms of quality) to the gateway G1 closest and common to the routing path to B, C and D, saving valuable bandwidth in that transmission path. At the gateway, the content will be transcoded and split off into 2 separate streams, 1 going directly to B, the other going to the closest and common gateway in the path to C and D, further optimizing the use of bandwidth. There the content will be transcoded into 2 streams and delivered to C and D. On a large scale, in the example of broadcasting the Superbowl, one can imagine a single stream sent to an entire country—China, instead of several billion streams, one serving a single person in China. The savings of bandwidth would be tremendous. Thus Transcasting makes the delivery of rich media content timely and possible. Because of the savings of bandwidth, the video requested will reach the client in a timely manner since the congestion along the way will be greatly reduced.

According to one aspect of the invention, a method for an origin server computer is described. The method may include polling a first plurality of one-hop gateway servers for available bandwidth for each respective one-hop gateway server, polling a first plurality of one-hop gateway servers for available number of CPU cycles for each respective one-hop gateway server, and receiving a request in the source computer to provide data to a media sink in a desired format. Techniques may also include determining a bandwidth requirement for servicing the media sink, determining an estimated number of CPU cycles required for servicing the media sink, and determining a second plurality of one-hop gateway servers from the first plurality of one-hop gateway servers, one-hop gateway servers from the second plurality of one-hop gateway servers having an available bandwidth greater or equal to the bandwidth requirement for servicing a sink and an available number of CPU cycles greater or equal to the estimated number of CPU cycles for servicing the media sink. Determining a one-hop gateway server from the second plurality of one-hop gateway servers appropriate for providing the data to the media sink, the one-hop gateway server configured to receive data in a second format may also be performed. Additional steps that may be used include transcoding the data from a first format to the second format, and providing the one-hop gateway server with the data in the second format.

According to another aspect of the invention, a gateway server is described that includes a processor and a tangible memory coupled to the processor. The tangible memory may include code that directs the processor to detect a request to provide a source media to a media sink in a specified format, code that directs the processor to poll a plurality of one-hop gateway servers for available bandwidth for one-hop gateway server coupled to the gateway server, and code that directs the processor to determine a bandwidth requirement for providing the source media to the media sink. Additional code may include code that directs the processor to determine whether a one-hop gateway server from the plurality of one-hop gateway servers has an available bandwidth greater or equal to the bandwidth requirement for providing the source media, code that directs the processor to receive the source media in a first format, and code that directs the processor to determine a second format for the source media, the second format appropriate for the one-hop gateway server.

The tangible media may also include code that directs the processor to transcode the source media from the first format into the second format, and code that directs the processor to provide the source media in the second format to the one-hop gateway server.

According to yet another aspect of the invention, a computer program product for a gateway server including a processor is disclosed. The computer program product includes a tangible memory coupled to the processor. The tangible memory may include code that directs the processor to detect a request to provide a source media to a media sink in a specified format, code that directs the processor to poll a plurality of one-hop gateway servers for available processing ability for each respective one-hop gateway server coupled to the media source, and code that directs the processor to determine a processing requirement for providing the source media to the media sink. The tangible memory may also include code that directs the processor to determine whether a one-hop gateway server from the plurality of one-hop gateway servers that has an available processing ability greater or equal to the processing requirement for providing the source media, code that directs the processor to determine a format for the source media appropriate for the one-hop gateway server, and code that directs the processor to transcode the source media into the format. Code that directs the processor to provide the source media in the format to the one-hop gateway server may also be resident within the tangible memory.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE SPECIFIC EMBODIMENTS

Figure 1:
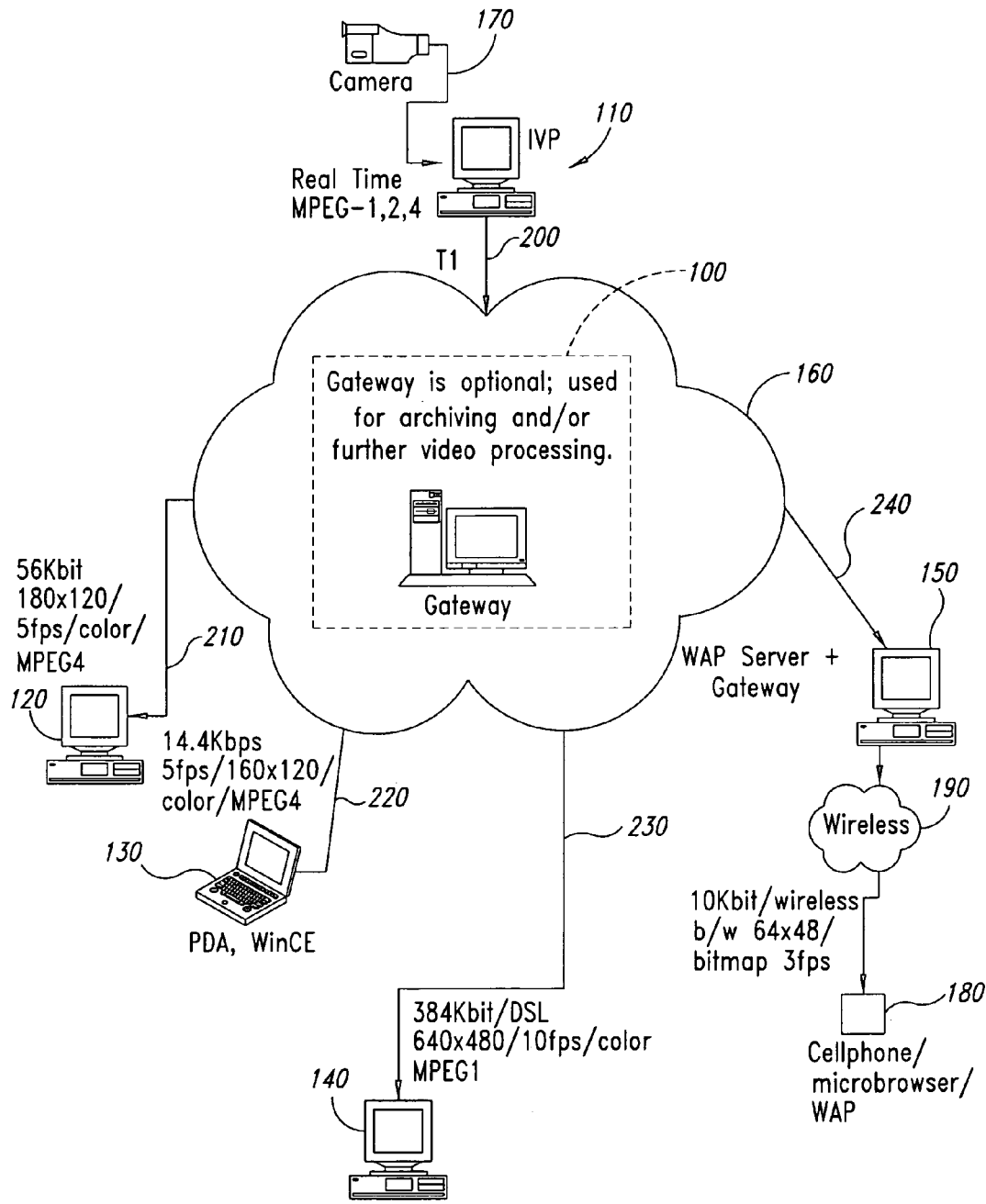
FIG. 1 illustrates a block diagram of a usage scenario according to an embodiment of the present invention.

FIG. 1 illustrates a block diagram according to an embodiment of the present invention. FIG. 1 illustrates a gateway computer 100, and plurality of computer systems 110–150 coupled to each other via a computer network 160. In the present embodiment, a video camera 170 is coupled to computer system 110, and a network appliance 180 is coupled via a wireless network 190 to computer system 150. Computer systems 110–150 are coupled to computer network 160 via network connections 200–240.

In the present embodiment, computer network 160 is the Internet. In alternative embodiments of the present invention, computer network 160 may be any computer network, such as an intranet, a computer network, a local area network, an internet, and the like. Computer network 160 provides data communication among computer systems 110–150 and gateway computer 100. Data communication may include transfer of HTML based data, textual data, form submissions, plug-in programs or viewers, applets, audio data, video data, and the like. Although computer network 160 is illustrated as a single entity, as is the case with the Internet, it should be understood that computer network 160 may actually be a network of individual computers and servers.

In the present embodiment, network connections 190–240 have typical maximum bandwidth characteristics that are known a priori. In FIG. 1, for example, network connection 200 is shown as a 1.5 mega bit per second (Mbps) TI connection, as is common with businesses; network connection 210 is shown as a 56 kilobit per second (kbps) connection as is common with home computers, set top boxes, and the like; network connection 220 is shown as a 14.4 kbit (kbps) connection to personal digital assistants (PDAs), such as PalmOS devices, WindowsCE devices, and the like. In this example, network connection 230 is shown as a 384 kbps digital subscriber line (DSL) connection as is common with small businesses or power users. In alternative embodiments, network connection 230 may be smaller or greater than 384 kbps, for example 1 mbps downstream and 500 kbps upstream, or the like. In embodiments of the present invention, other speeds of network connections are envisioned. Further, in practice, many network connection speeds may vary greatly with network traffic, time of day, and the like.

In FIG. 1, network connection 190 is shown as a 10 kbps connection as is currently planned for typical network appliances. The connection rate may vary, and may increase in alternative embodiments of the present invention. For example, alternative embodiments of network appliances may include wireless modems that may range in speeds of up to 128 kbps, or the like. It is believed that slower rates may be more widely utilized in typical network appliances to keep the cost of such appliances down.

In the present embodiment, computer systems 110, 120, 140, and 150 are embodied as typical personal computers such as those available from companies such as HP, Compaq, IBM, and the like. Such personal computers are typically powered by microprocessors such as the Athlon™ processor available from AMD and include operating systems such as Windows98™ from Microsoft. In alternative embodiments, other personal computers such as those available from Apple or Dell, may also be used. Computer systems 110 and 140 are typically desktop computers. Computer system 120 may be a desktop computer, a laptop computer, a television set top box, such as from WebTV™

Networks, game consoles such as the Dreamcast™, a network computer, or other types of units incorporating processors, microcontrollers, ASICs, and the like.

Computing systems 110, 120, 140, and 150 are typically connected to computer network 160 via local area networks, via dial-up modems, ISDN, DSL, cable modems, satellite modems, or the like.

In the present embodiment, computer system 130 typically includes PDAs or other portable computing platforms. Such PDAs may operate on a variety of operating system platforms including PalmOS, WindowsCE, or the like. Further, such PDAs operate on a variety of processors. Such devices are typically coupled to computer network 160 via telephone lines, or other wire-based network connections.

In the present embodiment, network appliance 180 may include wireless telephones including cellular technology, CDMA, TDMA, and other technologies. In other examples, network appliances may include kiosks, wrist watches, pocket or portable displays or terminals, wearable computers, retinal implants, surveillance equipment, kitchen appliances, and the like.

These devices are typically coupled to computer network 160 via computing system 150 and wireless network 190. In one embodiment of the present invention, computing system 150 is a wireless application protocol server (WAP) that provides data to and from network appliance 180 in the WAP format. In alternative embodiments, other standard and/or proprietary formats may also be used.

In the present embodiment, computer systems 120–140 and network appliance 180 include application software that communicates using the HTTP, TCP/IP, and/or RTP/RTSP protocols. These communication protocols are well known, thus no description is given herein. The application software is typically embodied as a web browser (client), in one embodiment. Further, the software is typically able to display *.gif, and/or *.jpg format images. For computer systems 120 and 140, the web browser software may be embodied as Netscape Navigator 4.x, Microsoft's Internet Explorer 5.x, or the like. In alternative embodiments of the present invention, other transfer and communication protocols may also be used, for example IPX, or the like. Further, different web client software may be used in other embodiments.

In the present embodiment, it is envisioned that video data will be transferred from computing system 110 to computer systems 120–150 and onto network appliance 180. The video data may also be provided by gateway computer 100. In one example, video data is stored on computing system 110 in a variety of formats including MPEG1, MPEG2, and MPEG4, as are well known in the art. In alternative embodiments other video formats are envisioned and may include the Windows *.avi format, the Quicktime *.mov format, or the like. In other embodiment, streaming video formats may be used to provide video data, for example formats from RealNetworks, Microsoft, Apple, or the like. In the present embodiment, the streaming video may be from a stored video archive, or from a live video camera 170, or the like. Whether archived or live, the video is typically output by computing system 110 onto computer network 160.

As illustrated in the examples in FIG. 1, computing systems 120–140 and network appliance 180 are all coupled to computer network 160 with different bandwidth limited connections. Further, computing systems 120–140 and network appliance 180 typically have different processing power, display capabilities, memory, operating systems, and the like. As a result of these differences, each system have different abilities to receive, process, and display video data.

In the example in FIG. 1, the bandwidth of network connection 230 between computing system 140 and computer network 160 is a DSL connection. As illustrated in FIG. 1, because the bandwidth is relatively large, network connection 230 is capable of providing computing system 140 with enough video data to display up to a 640×480 pixel color image at 10 frames per second (fps) using an MPEG1 format. In alternative embodiments, other configurations are envisioned, for example, 320×240 monochromatic image at 30 fps, or the like.

In the example in FIG. 1, the bandwidth of network connection 210 between computing system 120 and computer network 160 is limited to 56K by the modem. As illustrated in FIG. 1, because the bandwidth is relatively small, network connection 210 is capable of providing computing system 120 with enough video data to display up to a 160×120 color image at 5 fps using an MPEG4 format. As above, in alternative embodiments, other video configurations are envisioned, for example, a 80×60 4-bit image at 25 fps, or the like.

Still further, in the example in FIG. 1, the bandwidth of network connection 220 between computing system 130 and computer network 160 is limited to 14.4 kbps by the modem. As illustrated in FIG. 1, because the bandwidth is small, network connection 220 is capable of providing computing system 130 with enough video data to display up to a 160×120 256 color (8-bit color) image at 5 fps. As above, in alternative embodiments, other video configurations are envisioned, for example, a 80×60 16 gray scale (4-bit) image at 10 fps, or the like.

Also in the example in FIG. 1, the bandwidth of wireless network 190 between network appliance 180 and computer network 160 is limited to 10 kbps. As illustrated in FIG. 1, because the bandwidth is very small, wireless network 190 is capable of providing network appliance 180 with enough video data to display up to a 64×48 black and white image at 3 fps. As above, in alternative embodiments, other video configurations are envisioned, for example, a 32×24 black and white image at 10 fps, or the like.

In the present embodiment, gateway computer 100 is coupled to computer network 160 and is configured to provide video data to computer systems 120–140 and network appliance 180. In particular, in the present embodiment, gateway computer 100 is configured to receive video data from computer system 110 and to provide video data to each device according to that device's bandwidth limitations, and in the output format desired. In this example, gateway computer 100 delivers a stream of video data to computer system 120 that represents a 160×120 resolution color image at 5 fps, in the MPEG4 format; gateway computer 100 delivers a stream of video data to network appliance 180 that represents a 64×48 resolution black and white image at 3 fps, in a custom format; and the like. Further details regarding gateway computer 100 are given below.

The diagram in FIG. 1 is merely an illustration which should not limit the scope of the claims herein. One of ordinary skill in the art would recognize many other variations, modifications, and alternatives.

Figure 2:
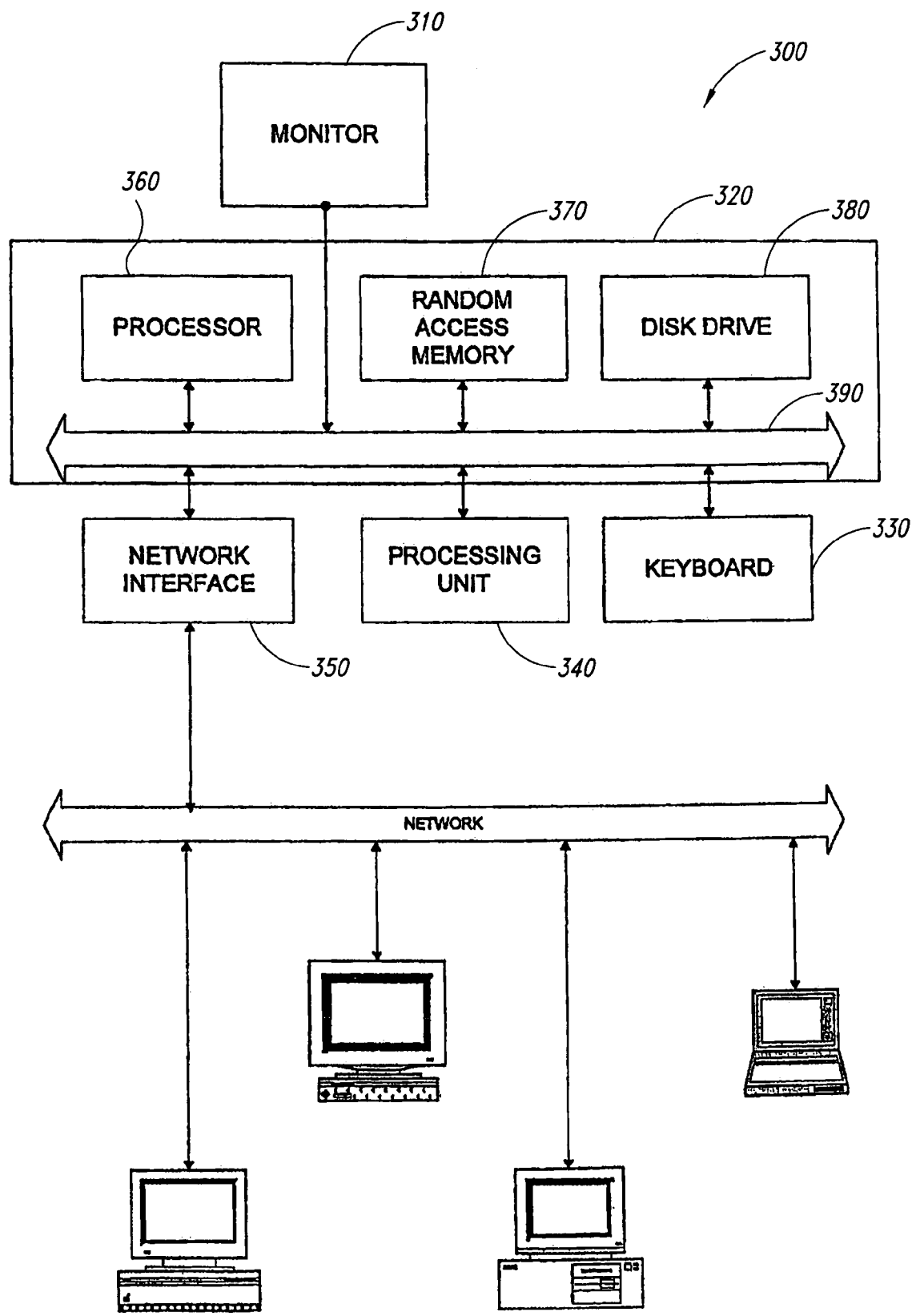
FIG. 2 is a block diagram of a typical gateway computer and its interface to client computers according to an embodiment of the present invention.

FIG. 2 is a block diagram of a typical gateway computer 300 according to an embodiment of the present invention. Gateway computer 300 typically includes a monitor 310, a computer 320, a keyboard 330, a graphical input device, a processing unit 340, a network interface 350, and the like.

In the present embodiment, a graphical input device is typically embodied as a computer mouse, a trackball, a track pad, wireless remote, and the like. Graphical input devices typically allow the users to graphically select objects, icons, text and the like output on monitor 310 in combination with a cursor.

Processing unit 340 is typically embodied as a high bandwidth PC bus, such as the PCI and the like, plug-in card into computer 320. In the present embodiment, processing unit 340 provides much of the functionality that will be described below. Presently, processing unit 340 is a plug-in board, that is not yet currently available from Luxxon Corporation, the assignee of the present invention. In alternative embodiments of the present invention, the functionality provided by processing unit 340 may be implemented on a host computer 320 as software. In such a case, little additional hardware is typically needed.

Embodiments of network interface 350 include an Ethernet card, a modem (telephone, satellite, cable, ISDN), (asynchronous) digital subscriber line (DSL) units, and the like. Network interface 350 is coupled to a typical network as shown.

Computer 320 includes familiar computer components such as a processor 360, and memory storage devices, such as a random access memory (RAM) 370, a disk drive 380, and a system bus 390 interconnecting the above components.

In one embodiment, computer 320 is a PC compatible computer having an x86 based microprocessor, such as an Athlon microprocessor from Advanced Micro Devices, Inc. Further, in the present embodiment, computer 320 typically includes a WindowsNT operating system from Microsoft Corporation.

RAM 370 and disk drive 380 are examples of tangible media for storage of data, audio message files, computer programs, browser software, embodiments of the herein described invention, applet interpreters or compilers, virtual machines, and the like. Other types of tangible media include floppy disks, removable hard disks, optical storage media such as CD-ROMS and bar codes, semiconductor memories such as flash memories, read-only-memories (ROMS), and battery-backed volatile memories, and the like. In embodiments of the present invention such as set top boxes, mass storage, such as disk drive 380, and the like may be dispensed with.

In the present embodiment, gateway computer 300 also includes software that enables it to act as a server that communicates with computer systems 120–140 and network appliance 180 using the HTTP, TCP/IP, and/or RTP/RTSP protocols. In alternative embodiments of the present invention, other software and transfer and communication protocols may also be used, for example IPX, UDP or the like.

FIG. 2 is representative of but one type of system for embodying the present invention. It will be readily apparent to one of ordinary skill in the art that many other hardware and software configurations are suitable for use with the present invention. For example, other types of processors are contemplated, such as the Pentium -class or a Celeron™- class microprocessor from Intel Corporation, K6-x -class microprocessors from Advanced Micro Devices, PowerPC™ G3, G4 microprocessors from Motorola, Inc., and the like. Further, other types of operating systems are contemplated, such as Solaris, LINUX, UNIX, MAC OS 9 from Apple Computer Corporation, BeOS™, and the like.

Figure 3:
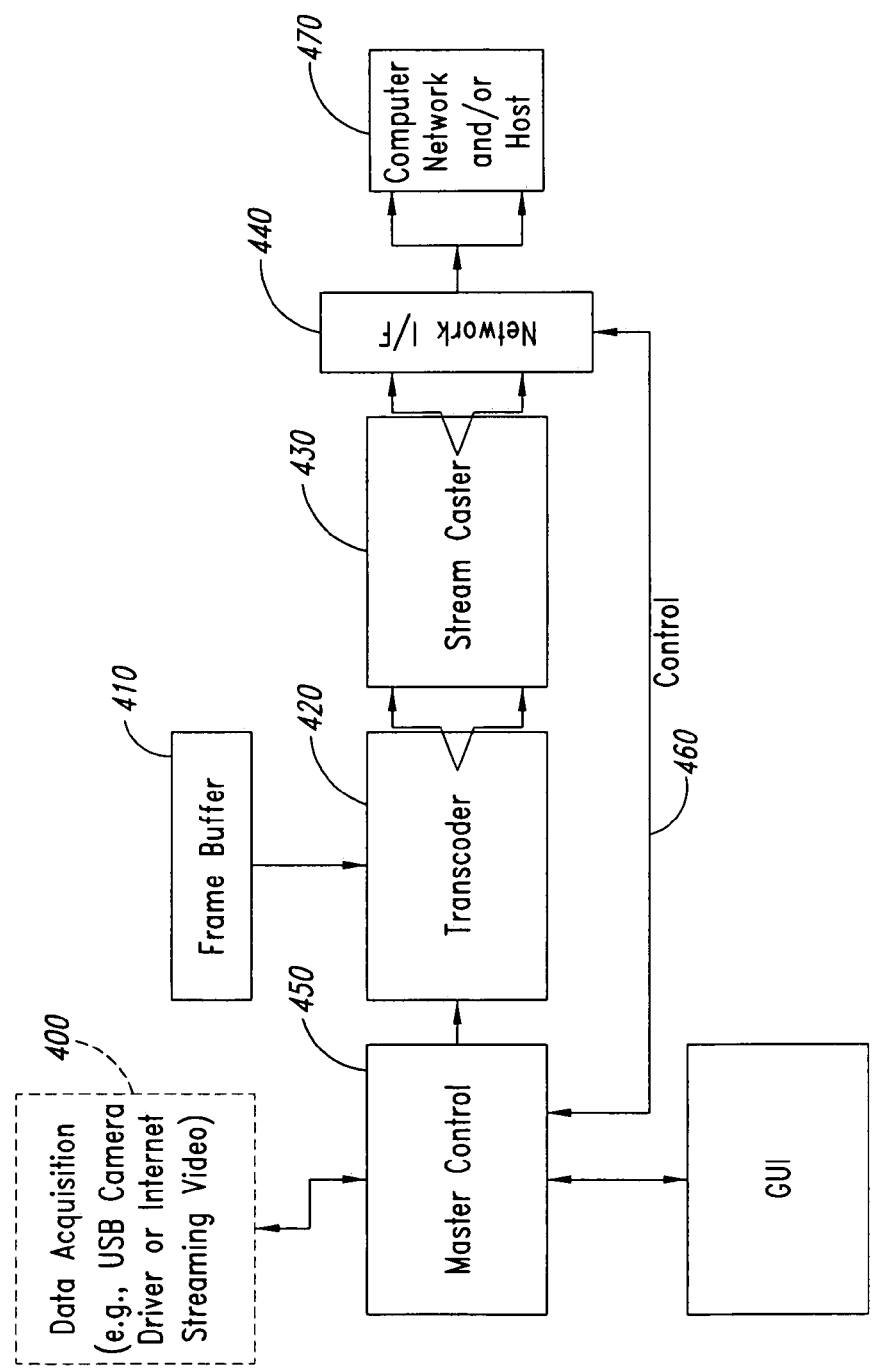
FIG. 3 illustrates a block diagram of an embodiment of the present invention.

FIG. 3 illustrates a block diagram of an embodiment of the present invention. In particular, FIG. 3 illustrates a logical block diagram of one embodiment of processing unit 340, in FIG. 2. FIG. 3 includes a data acquisition block 400, a frame buffer 410, a transcoder block 420, a stream caster block 430, a network interface block 440, and a control block 450. These blocks are illustrated coupled to each other and to a computer network 470.

In the present embodiment, data acquisition block 400 provides the input of a stream of video data. In one embodiment, of the present invention, a video camera, such as a universal serial bus (USB) video camera, may be coupled to a computer such as gateway computer 300. The video camera provides a stream of input video data, and the stream of input video is then typically processed by data acquisition block 400. In another embodiment of the present invention, the stream of input video includes discrete cosine transform (DCT) compressed video.

In one embodiment of the present invention, the streams of input video are embodied as streams of pixels of video data having associated luma and chroma values. In alternative embodiments, the streams of input video are embodied as streams of transformed or compressed video data. In such embodiments, the transformed video data typically comprises frames of video data that have been compressed by a discrete cosine transform (DCT) and quantization operation, or any other transform or compression (e.g. MPEG, JPEG, wavelet, fractal, or the like).

As shown in FIG. 3, in one embodiment of the present invention, data acquisition block 400 may include a USB interface camera, or the like. In such an embodiment, data acquisition block 400 may receive the pixels of video data, and/or data acquisition block 400 may perform the DCT compression operation. As illustrated, the output of data acquisition block 400 is then input to frame buffer 410. Data acquisition block 400 may alternatively receive the streaming video data from network 440 for input into frame buffer 410.

In one embodiment of the present invention, the stream of video data or compressed video data are derived from "live" video data or compressed video. That is, data acquired from live video cameras or sources. In alternative embodiments, the stream of input video data is derived from archived video files, typically stored on a tangible media. These stored files may be resident on gateway computer 300, or any other computer coupled to gateway computer 300. In one embodiment, data acquisition block 400 performs the DCT compression operation on such incoming data. In an alternative embodiment, the archived video files are stored, in the compressed format on the respective computers systems.

When video data is derived from an external computer, for example, computer system 110, the stream of input video data typically utilizes a real-time streaming protocol known in the industry such as RTP, or the like. In the present embodiment, data acquisition block 400 is also configured process and maintain the appropriate video session time stamps information.

In embodiments of the present invention, the source of video may be a streaming media from a source on a network, such as computer system 110 on network 160. In such a case, the video stream is typically encoded in formats such as, JPEG, JPEG-2000, GIF, WBMP, MPEG-1, MPEG-2, MPEG-4, H.263, *.avi, *.mov, *rm, *.aff, and the like. In this embodiment, data acquisition block 400 includes a decoder block that decodes the data from the encoding format. The decoded data may include pixel intensity values or DCT compressed data. The decoded data is then input and stored into frame buffer 410, as described below.

In the present embodiment, control block 450 is used to control the processing of data within the processing unit. In particular, control block 450 is used to manage transactions over the network via network interface 440. Further, control block 450 is used to manage input video data streams, is used to manage output video data streams, and the like as will be discussed below.

In one example, control block 450 receives information associated with the stream of input video data. Such information typically includes bandwidth parameters such as the spatial resolution of the input video contained within the stream of input video data, the color bandwidth, or color bit-depth, of the input video, the number of frames per second of the input video, and the like. In this embodiment, the information also includes the video format, i.e. how the input steam of data is encoded, such as MPEG format, Windows Media format, H.263, QuickTime format, Real Video format, or the like.

The data associated with the input video data may be derived from the input video data itself. Alternatively, the bandwidth parameters, desired format, and the like may be forwarded to control block 450 before the input video data stream begins.

Control block 450 also receives information associated with desired properties of streams of output video data. Such information typically also includes bandwidth parameters such as the spatial resolution of the output video contained within the stream of output video data, the color bandwidth (color bit-depth) of the output video, the bit rate of the output video, the number of frames per second of the output video, the contrast gain of the output video, and the like. Further, control block 450 also receives information regarding what format the output stream of data should be encoded in, such as M-JPEG, GIF, MPEG format, H.263 format, Windows Media format, Quicktime format, Real Video format, or the like.

The data associated with the output video data is typically derived from the requesting device. For example, in FIG. 1, the requesting device could be computer system 120–140, network appliance 180, or the like. In this embodiment, when the requesting device contacts gateway system 100 to request gateway system 100 send a video stream, the requesting device will also inform gateway system 100 as to the bandwidth requirements. For example, such requirements may include maximum frame rate, color-depth, screen resolution or spatial bandwidth, maximum bit rate, and the like. Further, the requesting device will also inform gateway system 100 which output video format should be used to encode the data. For example, JPEG, JPEG-2000, GIF, WBMP, MPEG-1, MPEG-2, MPEG-4, H.263, *.avi, *.mov, *rm, *.aff, and the like.

In one embodiment of the present invention, the bandwidth data and the format data is forwarded to gateway system 100 along with the request for video data. In an alternative embodiment of the present invention, the requesting device (computer, PDA, cell phone, etc.) merely identifies itself to gateway system 100. In such an embodiment, gateway system 100 receives the identifier, uses the identifier to locate an entry in a database file or other external source that specifies the bandwidth requirements, format requirements, and the like, for that device. Such a file may be resident on gateway system 100, or resident on another computer. Such a file may be compiled based upon manufacturer data, network service provider data, and/or experimental results.

In one embodiment, the identifier may be unique for each class of device. For example, computers having a 56K modem will be in one class, cell phones having low display and processing abilities will be in one class, some cell phones having higher display and processing abilities will be in another class, and the like. Further, super-classes or sub-classes could also be specified which also indicate what type of format is desired.

In still other embodiments, the class may be divided by manufacturers of the device, and/or model of the device. As an example, all set top boxes (such as WebTV™) with a 56K modem will be in one class, all cellular telephones based upon Crusoe™ chips and technology from Transmeta Corporation will be in another class, all PalmOS based devices will be in its own class, Motorola devices will be in another class, and the like. In one embodiment, each different model of device from each manufacturer and/or service provider may send a unique identifier to the computer network.

In response to the unique identifier, gateway system 100 will determine the bandwidth requirements, desired output format, and the like of the device. This data is then passed to control block 450 for processing.

In one embodiment of the present invention, the above data is typically passed to control block 450 before the processing by the blocks in FIG. 3 begins and before video data is output from network block 440. In another embodiment, video data may be output in a default format, until control block 450 receives or determines the desired output bandwidth, format, or the like. Such a default format may be a low bandwidth, low resolution, low frame rate, gray-scale image, or the like. Later, as the desired output bandwidth is determined and processed, the bandwidth and format of the output stream will be adjusted to the desired parameters.

In response to such data, control block 450 manages communication between data acquisition block 400 and frame buffer 410, manages the operation of transcoder block 420, manages the streams of output video data in conjunction with stream caster block 430, and the like.

In the present embodiment, control block 450 is embodied as firmware running on a microprocessor (uP) including program memory, data memory, and the like. In one embodiment, the uP is a Motorola 68XXX processor, although in alternative embodiments of the present invention, DSPs from other manufacturers may be used. In other embodiments of the present invention, control block 450 may be embodied as an application specific integrated circuit (ASIC) or the like.

FIG. 3 also includes frame buffer 410. In the present embodiment, frame buffer 410 is used to buffer the stream of video data from data acquisition block 400, for processing by transcoder block 420. In this embodiment, the type of data and the rate at which frame buffer is updated are fixed by data acquisition block 400, under control of control block 450. In this embodiment, the data stored in frame buffer 410 may include pixels of video data having associated values (uncompressed); frames of video data that have been compressed with a quantized DCT operation; and the like. In one embodiment of the present invention, the video data may be stored in RGB component space, YUV component space, HSV component space, gray scale, and the like.

In one embodiment of the present invention, frame buffer 410 typically includes one or two buffers, each having a frame size of approximately 800 horizontal pixels by 600 vertical pixels (800×600). Each buffer typically has a bit-depth of at least 24 bits in one embodiment. Frame buffer 410 is typically minimally embodied as a 3 Megabyte DRAM, although larger sized memories may also be used. Alternatively, SRAM devices or embedded DRAM, or the like may also be used.

In this embodiment, transcoder block 420 retrieves incoming data from frame buffer 410 fully decompresses or partially decompresses the data, reduces the bandwidth of the data, and forms a stream of output data in a desired format. Transcoder block 420 receives the bandwidth requirements and the desired output format from control block 450. Further detail regarding transcoder block 420 will be given below.

In the present embodiment, stream caster block 430 is typically used to receive a stream of output video data from transcoder block 420 and to format the data for transmission to network interface 440. In this embodiment, network protocols used include TCP/IP protocols, although in other embodiments, other network protocols may also be used. In this embodiment, stream caster block 420 packetizes the output data stream, and determines IP addresses, payload lengths, and the like. Further, stream caster block 420 forwards the data segments into the appropriate TCP socket of network interface 440.

In this example, network interface 440 receives the segmented data from stream caster 430 and transmits the data to a network. The network, may be a computer network 160 such as the Internet, a LAN, or the like. In the present embodiment, the network is TCP/IP based. In the present embodiment, network interface 440 is used to create, monitor, and close all the TCP/IP sockets and RTSP.

In this embodiment, network interface 440 also sends and receives data to and from a network via the TCP/IP sockets and sends incoming data to control block 450. In alternative embodiments, network interface 440 may use other network protocols such as IPX, and other conventional and future-developed network protocols. Further, network interface 440 may use other data streaming protocols such as RTP, and any other conventional and future-developed streaming protocol.

Figure 4:
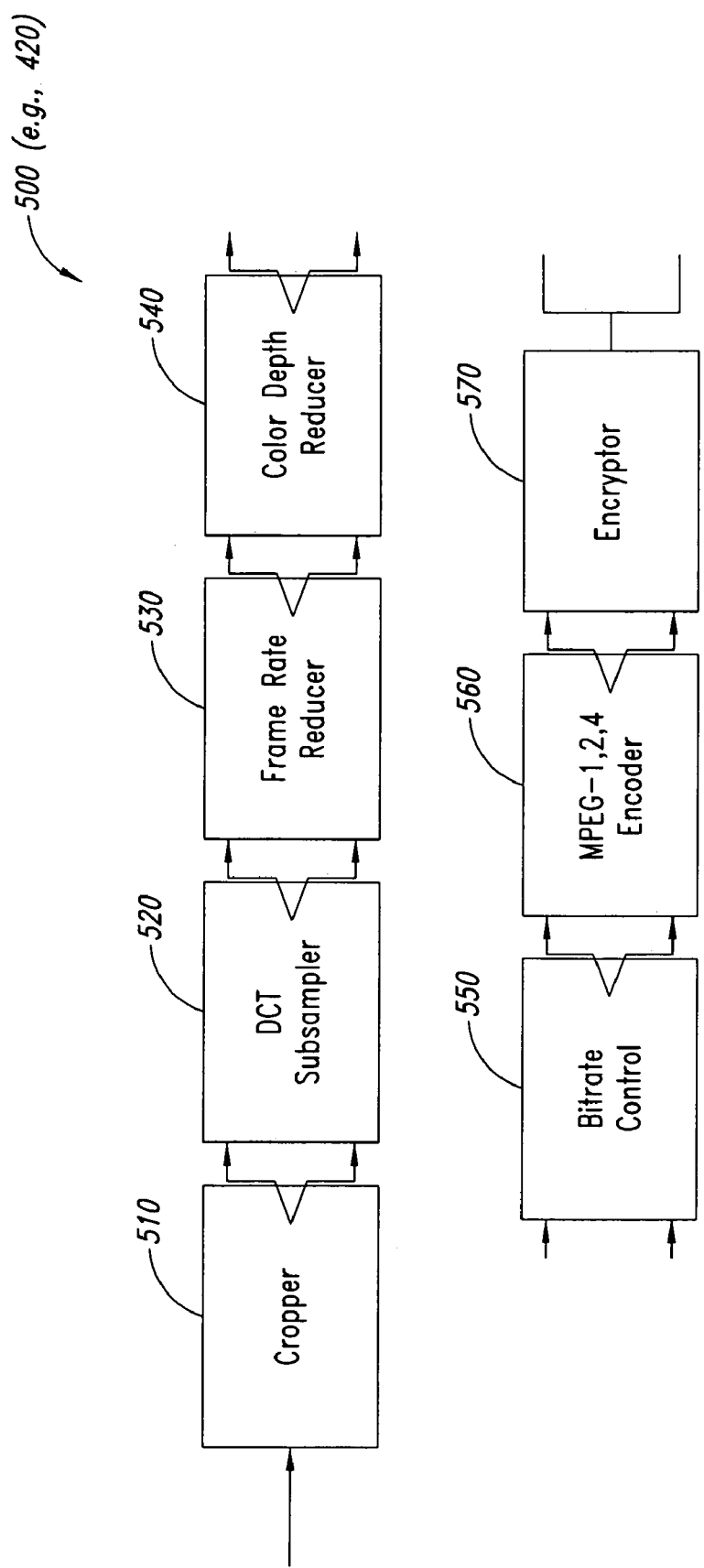
FIG. 4 illustrates a block diagram of a transcoding compound according to an embodiment of the present invention.

FIG. 4 illustrates a block diagram according to an embodiment of the present invention. In particular, FIG. 4 illustrates functional blocks available in a transcoder 500 according to one embodiment. Transcoder 500 includes a cropper block 510, a sampler block 520, a frame rate block 530, a color depth block 540, a bit rate control block 550, an encoder block 560, and an encryptor block 570. As was illustrated in FIG. 3, transcoder 500 is coupled to a frame buffer 410, and outputs data to stream caster 430, in the present embodiment.

In FIG. 4, cropper block 510 retrieves frames of data from frame buffer 410. In this embodiment, cropper block 510 extracts a rectangular region of data from each frame retrieved from frame buffer 410. The extents of the rectangular region are specified in a "stream table" when receiving streaming video data. If no cropping is specified, cropper block 510 merely grabs the whole frame. Cropping is specified when there is a particular portion within a video frame that the requester wants to see.

Also illustrated in FIG. 4 is a sampler block 520 that receives input from cropper block 510. In this embodiment, sampler block 520 receives a desired output spatial resolution from control block 450.

In one embodiment of the present invention, sampler block 520, subsamples the image received from cropper block 510, to obtain the desired output resolution. As an example, an incoming frame may have 640 horizontal pixels×480 vertical pixel resolution, however the desired output video image is 80 pixels×60 pixels. In such an example, cropper block 510 may simply take every eighth pixel of the incoming frame for the output frame. Other methods of subsampling are also contemplated, for example, cropper block 510 may average eight pixels to obtain the value for the output pixel. Other methods, such as filtering, for subsampling are contemplated in alternative embodiments of the present invention.

In another embodiment, sampler block 520, supersamples the image from cropper block 510, to obtain the desired output resolution. As an example, an incoming frame may have an 80×60 pixel resolution, however the desired output video image has a 640×480 pixel resolution. An example of this may be a hand-held wireless video camera transmitting live video to a newsroom computer via the Internet. In such an example, cropper block 510 may use any conventional method for upscaling the image. For example, cropper block 510 may use pixel replication, with or without bi-linear, or bi-cubic filtering techniques, and the like. Other methods for upscaling the incoming frame are contemplated in alternative embodiments of the present invention.

In the present example, frame rate block 530 receives the sampled frames of data from cropper block 510. Frame rate block 530 also receives an indication of a desired frame rate for output video from control block 450, typically in frames per second (fps). In the present embodiment, control block 450 also knows the frame rate of the incoming video, also in fps. This frame rate is also sent to frame rate block 530.

In one embodiment, of the present invention, frame rate block 530 compares the incoming frame rate to the desired output frame rate, and adjusts the number of frames accordingly. For example, frame rate block 530 will drop frames of data to lower the number of frames per second, or will add frames of data to increase the number of frames per second.

In the case where the output frame rate is lower than the input frame rate, frame rate block 530 may use a counter to count to a specific number. When the number is reached, the current frame is dropped, or alternatively, the current frame is not dropped. For example, if the desired frame rate is 10 fps and the incoming frame rate is 11 fps, every time a counter counts to 10, the next frame is simply dropped. As another example, if the desired output frame rate is 5 fps, and the incoming frame rate is 30 fps, every time the counter counts to 6, the next frame is not dropped, but is passed to the next functional block.

In another embodiment, frame rate block 530 may be embodied as a first-in first-out frame (fifo) stack. In such an example, frames of input video are stored in a buffer location specified by a write pointer, and frames of output video are retrieved from a buffer location specified by a read pointer. In operation, every incoming video frame is written into the fifo stack, however, only when the frame is to be output is the write pointer incremented. In such a case, data read out of the fifo stack may be sequential. Still other methods for reducing the frame rate are contemplated in alternative embodiments of the present invention.

In an alternative embodiment of the present invention, frame rate block 530 will add frames to increase the frame rate. For example, if the incoming frame rate is 10 fps, and the desired frame rate is 20 fps, frame rate block 530 will add frames to the video stream every other frame. One technique for increasing the numbers of frames involves interpolating the motion vectors of blocks in the frames. Many other methods for adding frames and increasing the frame rate are contemplated in alternative embodiments of the present invention, however are outside the scope of the present technical disclosure.

In the example in FIG. 4, color depth reducer block 540 sequentially receives the frames of data from frame rate block 530. In one embodiment, color depth reducer block 540 also receives an indication of the bit-depth for pixels in the incoming frame of data, and the desired bit-depth. In the present embodiment, in response to the bit depths, color depth reducer block 540 maps the number of bits from the input frame to the desired number of bits in the output frame.

As an example, the incoming image may have a 30 bit bit-depth, for example three component color having 10 bits of hue data, 10 bits of saturation data, and 10 bits of intensity data; the desired bit depth of the output frame may be 6 bit gray scale. In such an example, to reduce the color depth, color depth reducer block 540 may take only the 6 most significant digits in the intensity data for the output frame.

In another example, the incoming image may have a 24 bit bit-depth, for example, an RGB image having 24 bits of information (8:8:8), and the desired bit depth of the output frame may be 256 colors, or 8-bit color. In such an example, color depth reducer may re-map or dither, the values from the 24 bit color space into the 8 bit color space. Such dithering techniques are well known. In alternative embodiments, other types of techniques may be used to reduce the bit depth from an input video frame to obtain a desired output frame bit-depth.

In alternative embodiments of the present invention, increasing the color bit-depth may also be performed, using known techniques.

In the present embodiment, bitrate control block 550 receives the output from color depth reducer block 540. In the present embodiment, bit rate control block 550 also receives a desired output bit rate from control block 450. For M-JPEG encoding, bit rate control block 550 is used to statistically compute a new quantization scale factor for the data so that the effective bit rate more closely matches the desired output bitrate.

In the present embodiment, a quantization scale factor is first determined. The quantization scale factor is used to compress or expand a frame of data so that it more closely matches the desired output bit rate. In theory, in one embodiment the quantization scale factor is equivalent to a modulus (Mod) operator, or a most significant bits (MSBs) operator. In such cases, the differences between pixels that are close in value (e.g. 20 and 21), are ignored. As another example, values 20–23 may be considered the same as 20.

In this example, the quantization scale factor is determined by analyzing the number of bits per second are produced by a t0 frame of data. The number of bits is divided by the frame time to obtain a calculated bit rate in this embodiment. This calculated bit rate is compared to a desired bit rate to obtain the quantization scale factor.

The quantization scale factor is then applied to scale the next frame of data, a t1 frame of data. Continuing the example above, the next frame of data may be scaled by 2, so that the bit rate of the next frame of data will be 10 kbps. In the present embodiment, bit rate scaling is performed by reducing the effective color depth by the quantization scale factor, to meet the desired bandwidth requirements. In this example, the color depth is halved, i.e. the bottom least significant bits (LSBs) are ignored.

In one embodiment of the present invention, bit rate control block 550 monitors each frame, and attempts to control the bit rate to match the desired output bit rate for virtually all frames. In some embodiments, the quantization scale factor is updated every frame time, and in other embodiments, the quantization scale factor may be updated every Xth frame time. Where X is selectable automatically or manually.

In an alternative embodiment, a more simplistic techniques is utilized. In such an embodiment, if the incoming bit rate is above the desired output bit rate, a predetermined quantization scale factor is applied to the next frame. Further, if the incoming bit rate is below the desired output bit rate, another predetermined quantization scale factor is applied to the next frame. In such an embodiment, such predetermined quantization scaling factors may be selected ahead of time, based on empirical data, or the like. Still, in other embodiments of the present invention may provide for increasing the effective bit rate.

In FIG. 4, encoding block 560 next receives the bit-rate adjusted frames of data. Encoding block 560 may also receive a request for an encoding data format, specified for by control block 450. In the embodiment illustrated in FIG. 4, encoding block 560 is embodied as an MPEG encoder. Encoding block 560 may include dedicated hardware encoders, such as those available from Sigma Designs, and the like.

In the present embodiment, for MPEG-1, MPEG-2, and MPEG-4 encoding, it is contemplated that I-frame data will be compressed. In another embodiment, P-frames, and even B-frames may also be compressed. For MPEG-4 encoding, it is contemplated that both I-frame data and P-frame data be compressed for transmission purposes. Detail description of I, P, and B frames are outside the scope of this technical disclosure.

In other embodiments of the present invention, alternative formats may specified, for example *.avi format video, *.mov format video, streaming video such as in the *.rm format from Real Networks, or *.aff format from Microsoft, or the like. Such formats may be in the public domain, or proprietary. Further, encoding block 560 may be embodied as specialized dedicated hardware, or as software routines on a digital signal processor (DSP), a microprocessor (Athlon, PentiumIII), or the like.

After encoding, the video data may be encrypted by encryptor block 570.

The above embodiment was illustrated in FIG. 4 as having specified interconnections between blocks. However, in alternative embodiments of the present invention, the different blocks may be interconnect in different ways, and may be dynamically interconnected in different ways. As an example, an incoming frame may include 24-bits of 640×280 color image whereas the desired output image is an 8 bit 80×60 gray scale image. In such an example, it is preferable to reduce the color depth information, before subsampling the image for sake of efficiency. In such a case, the data is passed to the color depth reducer 540 then to the sampler block 520. The interconnections between the blocks, and the data flow may be dynamic, and change according to specific need.

If implemented in hardware or partially in hardware, an efficient multiplexer or cross-bar mechanism can be used for embodiments of the present invention. If implemented in software, little if any additional hardware interconnections are typically required.

Figure 5A:
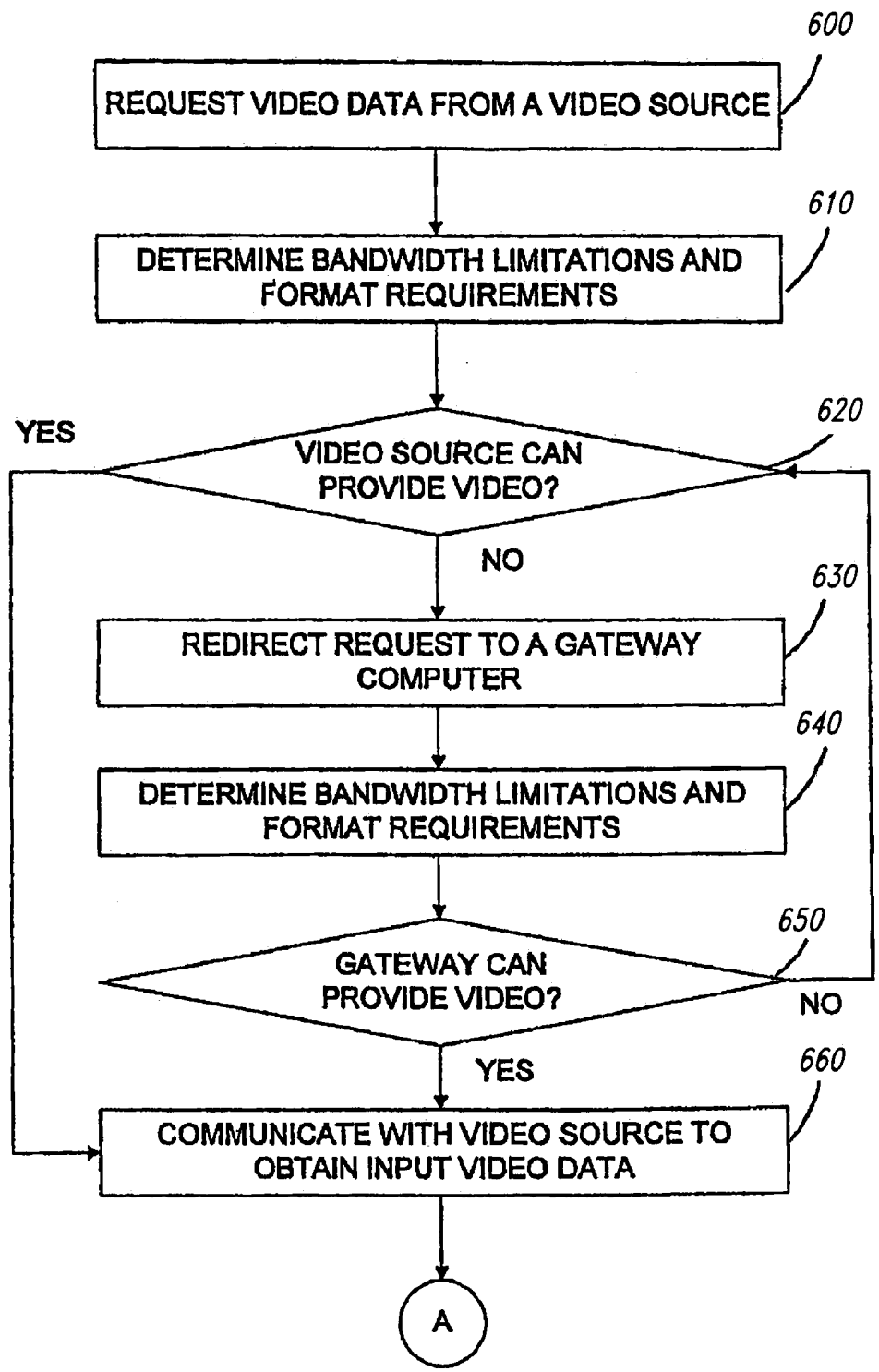
FIGS. 5A and 5B illustrates an overview flow diagram according to an embodiment of the present invention.
Figure 5B:
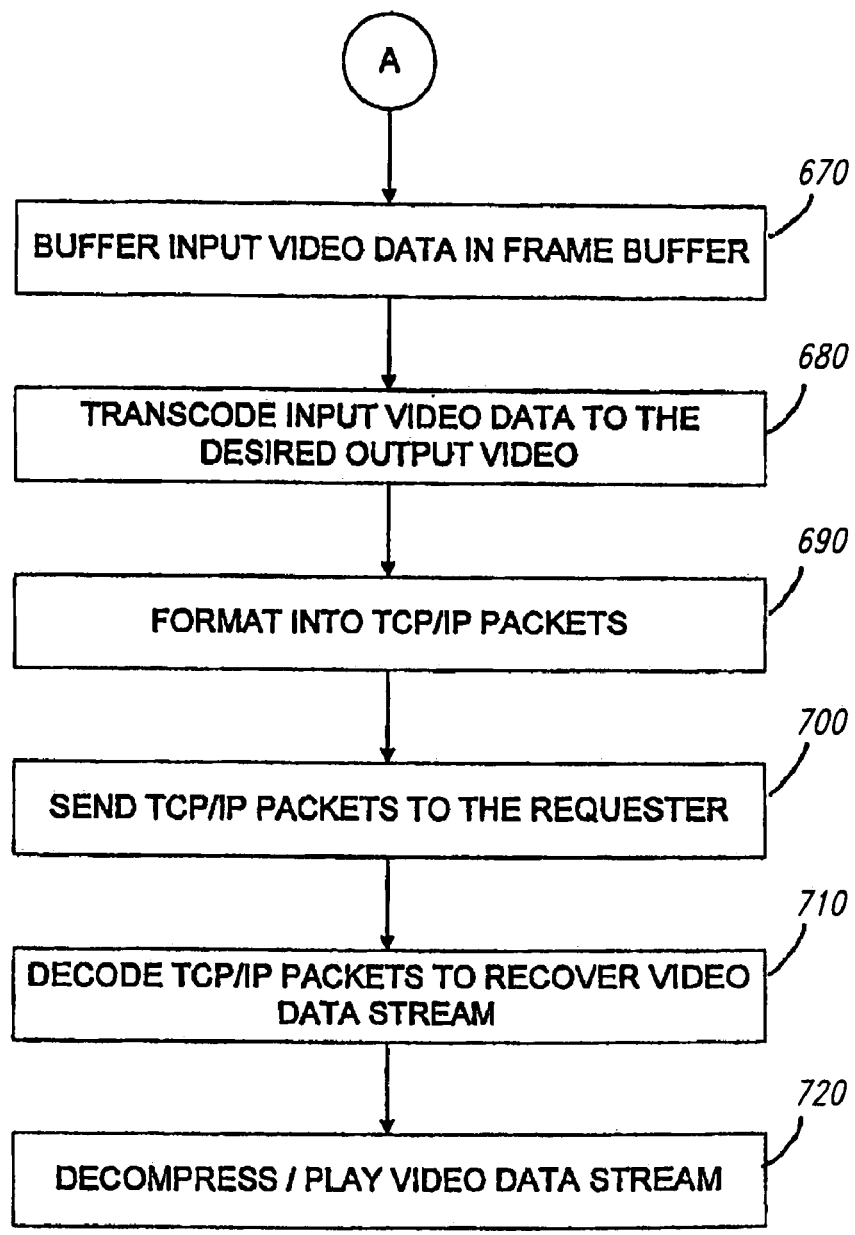

FIGS. 5A and 5B is an overview flow diagram according to an embodiment of the present invention.

Initially, a device requests a stream of video data from a video source, step 600. This step may be initiated by a user of a cellular telephone (requesting device) navigating the web, for example, and requesting to be coupled to the video source. An example of this is a commuter trying to connect with highway traffic cameras on the web, so she can see which way is the best way home.

Included with this request may be an indicator of the type of device she is calling from. For example, a cellular telephone, a wireless PDA, or the like. In response to the identifier, the video source determines the bandwidth requirements and desired format of the device, step 610. As discussed previously, the request for the stream of video data may include the bandwidth and format requirements, in one embodiment. In other embodiments of the present invention, the identifier simply identifies the class of the device, the manufacturer of the device, the model of the device, the class of service and quality of service, or the like. Based upon one or more of these identifiers, the bandwidth and format requirements may be determined by the video source.

In the present embodiment, the video data requirements of the requesting device may vary widely. For example, the output video streams may be of different file or video formats, may have different color depths, may have different frame rates, may have different bit rates, and the like. As an example, embodiments of the present invention may output video streams having output resolutions as little as 8×8. More typically, the output video is a multiple of a frame approximately 80×60 pixels. For example, the output video may have a spatial bandwidth of approximately 160×120, 320×240, 640×480, or virtually any resolution in-between. As another example, for Real Media format, encoding frames sizes of approximately 352×288 and 176×144 are typical. In alternative embodiments, the output resolution may be as little as 1 pixel.

In embodiments of the present invention, the output frame rate specified are typically up to 30 frames per second, since the input frame rate from video cameras, 30 fps, is typically the limiting factor. In other embodiments, other output frame rates may be specified, for example 5, 15, 29 fps, and the like.

In this example, the bit-depth of the output video may vary from 1 bit up to 30 bits. In this embodiment, 30 bits are typically split into 3 components of 10 bits of data each, for example, RGB, HSV, or the like. Greater than 10 bits may be provided for each component in the future, as camera/sensor technology increases.

The maximum bit rate for the output video data stream may also be specified by the requesting device, in the present embodiment.

In this embodiment, the source determines whether it can handle the video request from the device, step 620. For example, the source may determine whether the desired format is one which the source supports, the source may determine whether it has the bandwidth to support the device, or the like. If not, the source redirects the device to a known gateway computer, as discussed above, step 630.

In the present embodiment the gateway computer also determines the bandwidth requirements and desired format of the device, step 640, in a similar manner as described above. Alternatively, the source may re-transfer the bandwidth and format requirements to the gateway computer.

In this embodiment, the gateway computer also determines whether it can handle the request from the device, step 650. For example, the gateway may determine whether the desired format is one which is supported, the gateway may determine whether it has the bandwidth to serve the device, and the like. In this embodiment, if the gateway computer cannot handle the load, the gateway "bounces" the request back to the source, step 660. In such a case, the source may determine whether it can now handle the request, and/or whether a different gateway computer can handle the request.

In the next step, the gateway communicates with the video source and in return begins to receive an input stream of video data, step 660. In embodiments of the present invention, the input stream of video data use RTP or other data streaming protocols.

Different input streams may be of different file or video formats, color depth, and the like. For example, embodiments of the present invention may receive input from sources having an input resolution as little as 8×8. More typically, the input video is a multiple of a frame approximately 80×60 pixels. For example, the input video may have a spatial bandwidth of approximately 160×120, 320×240, 640×480, or virtually any resolution in between. In one embodiment, Real Media format, for example, encodes at resolutions of approximately 352×288 and 176×144.

In the present embodiment, the input frame rate is typically up to 30 frames per second, because most video cameras produce a maximum of 30 frames per second. In other embodiments of the invention, other input frame rates may also be used, for example 7, 15, 29 fps, and the like.

The bit-depth of the input video may also vary from 1 bit up to 30 bits in the current embodiment. In this embodiments of the present invention, 30 bits provides 10 bits of data information to each color component, e.g. RGB, HSV, YUV or the like. In future embodiments, more than 10 bits may be provided for each component, based upon improvements on camera/sensor design.

In response to the input video data stream, frames of data are buffered and are stored in the frame buffer, step 670. In the present embodiment, the type of data, at rate at which the frame buffer is updated, is controlled by a control block.

In one embodiment of the present invention, the video data may be uncompressed, for example, where each pixel represents the intensity data. In an alternative embodiment, the video data may be in a compressed form, for example, a quantized wavelet transform on the frame of the video.

Next, the transcoder retrieves the frame of data and formats the data according to the bandwidth and format requirements for the output video stream, step 680. Further details regarding this step will be given below.

Once the data has been bandwidth reduced and format encoded, the stream of data is encoded for transmission via RTP or other protocol, step 690. In alternative embodiments of the present invention, other network transmission formats may be used, for example IPX, or the like. The data is then transmitted to the requesting device, step 700.

In the present embodiment, the requesting device receives the packets of data and strips the RTP headers to recover the stream of data, step 710. The data stream is then typically decompressed and then displayed on the requesting device, step 720. For example, the requesting device will retrieve MPEG-4 data, and then play that data to its display. As an example, the user may see that there is a traffic jam on the highway.

In alternative embodiments, other types of formats may be used, for example, AVI, MPG, MOV, XING and the like. In still other embodiments, other formats, including other proprietary formats may also be specified and used by the requesting device.

Figure 6:
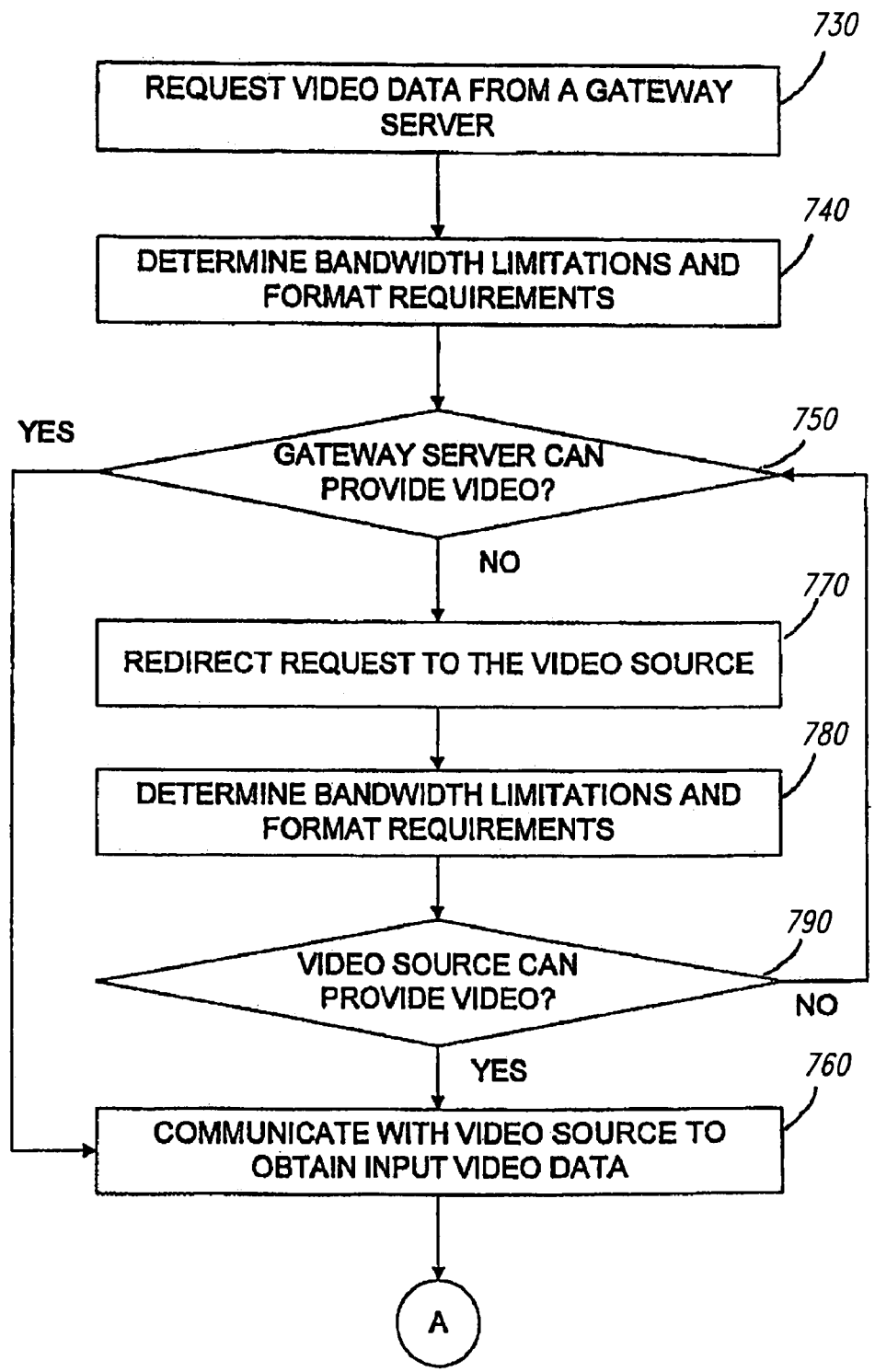
FIG. 6 illustrates another embodiment of the present invention.

FIG. 6 illustrates another embodiment of the present invention. In contrast to the embodiment illustrated in FIG. 5A, initially a request for video data stream is addressed to a gateway computer, step 730. In response to the request, the gateway computer determines the type of output video data stream encoding that is required, and what it estimates as the processing load to handle the transcoding, etc, and the like, step 740. As an example of the latter, gateway server may assume each additional output stream requires a particular amount of RAM and CPU idle time.

Next, the gateway computer determines whether it can provide the requested video data stream, step 750. As an example, the gateway computer determines whether the required encoding process is supported by it, and also if it has sufficient free resources to support the video output transcoding and stream. If so, the gateway computer requests the video data from a video source, step 760.

When the gateway computer determines that it does not support the requested encoding scheme and/or does not have sufficient resources to provide the output stream, the video request is directed back to the video source, step 770. In turn, the video source typically determines the type of output video data stream encoding that is required, and what it estimates as the processing load to handle the transcoding, etc, and the like, step 780. As an example of the latter, video source may also assume each additional output stream requires a particular amount of RAM and CPU idle time.

Next, the video source determines whether it can provide the requested video data stream, step 790. As above, the video source may determine whether the required encoding process is supported by it, and also if it has sufficient free resources to support the video output transcoding and stream. If so, the video source provides the video data stream, step 760.

In the present embodiment, if the video source cannot provide the video data stream, the request is returned to the originating gateway server. In an alternative embodiment, the video source may forward the request to a different gateway server than the original one.

Figure 7A:
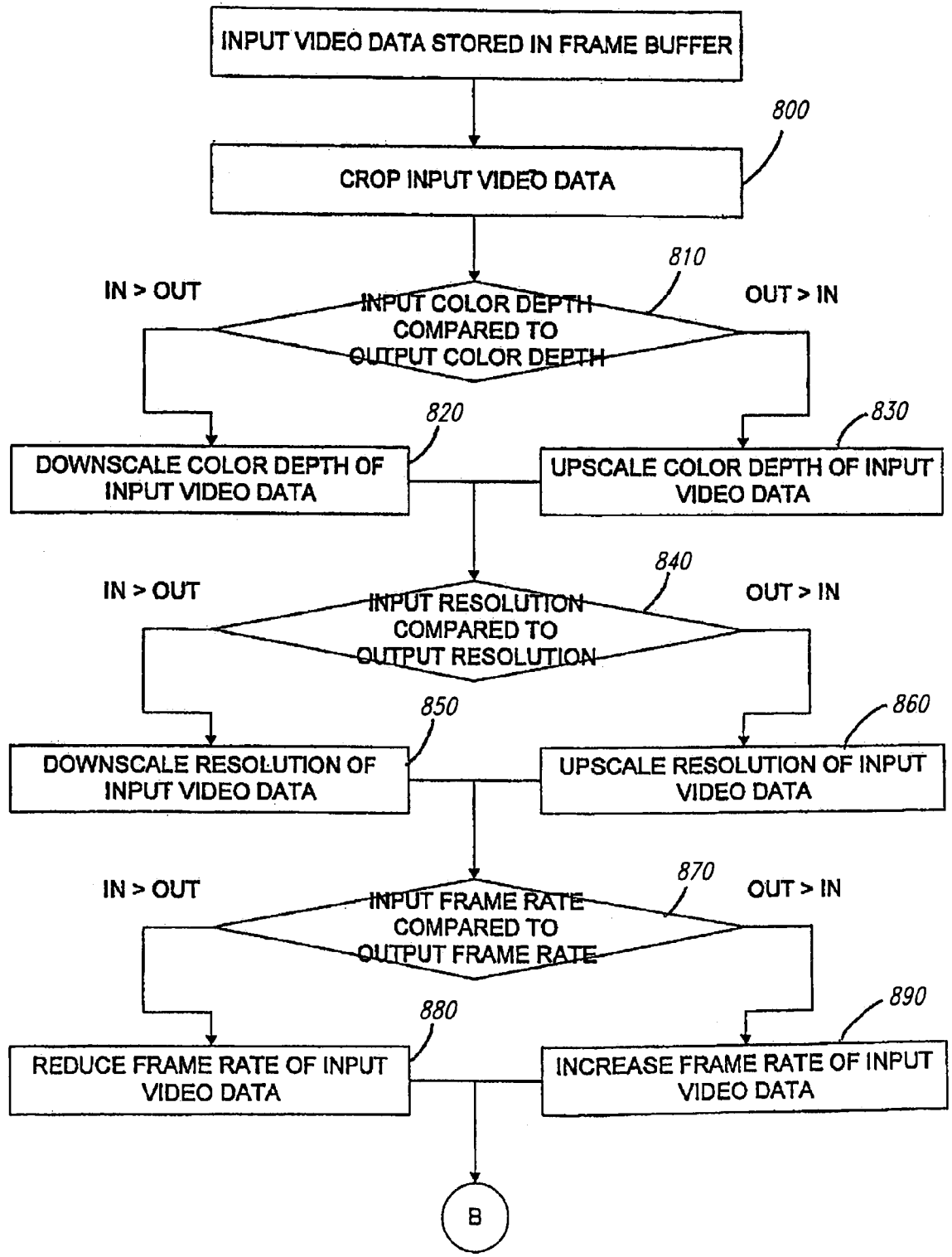
FIGS. 7A and 7B illustrates a more detailed embodiment of the present invention.
Figure 7B:
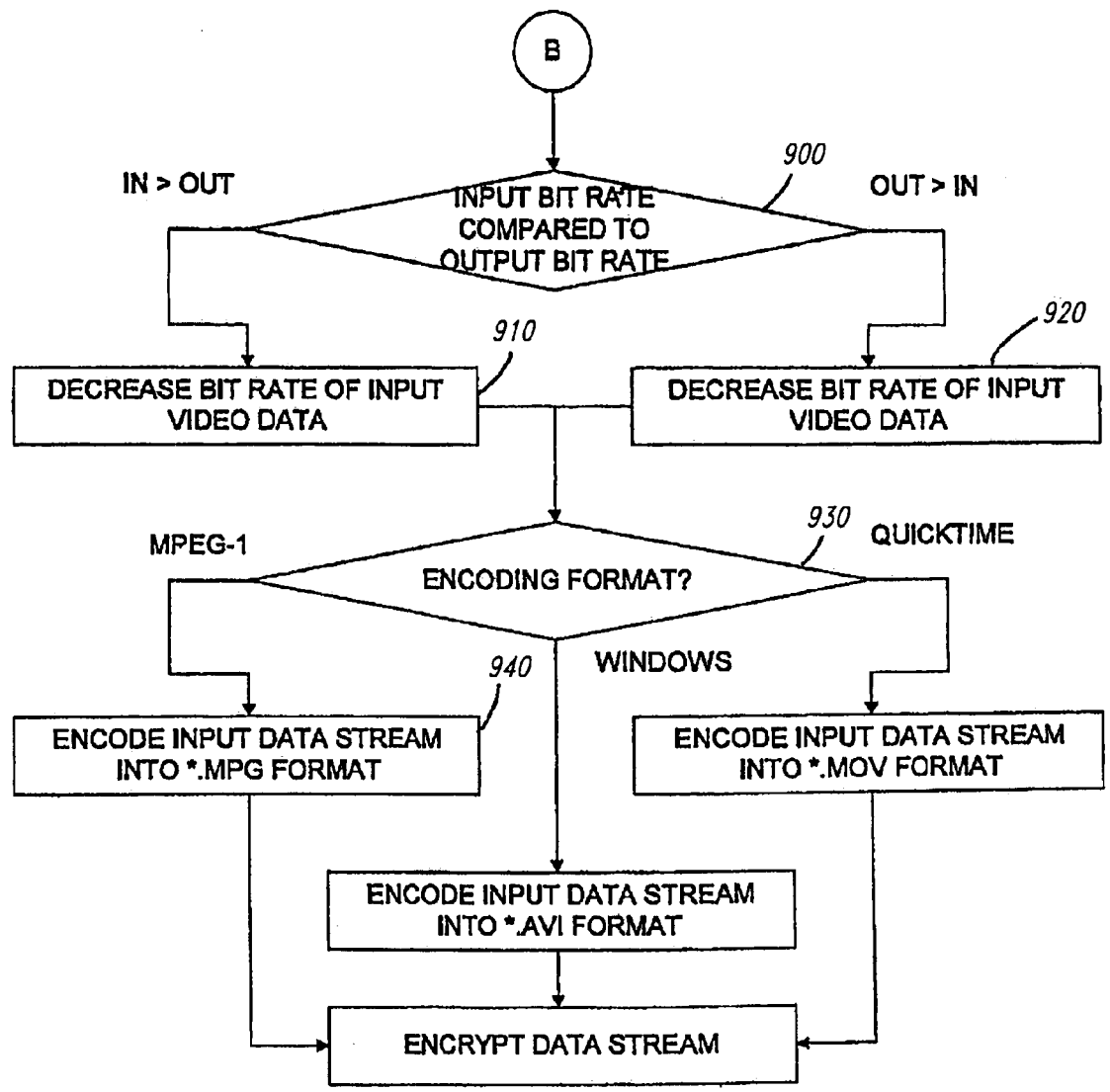

FIGS. 7A and 7B illustrates a more detailed embodiment of the present invention. In particular, FIGS. 7A and 7B illustrates a block diagram of a transcoding process according to one embodiment.

As disclosed above, a frame of input video data is initially put into the frame buffer. In the present embodiment, when the data is derived from a streaming or file video source, the first step, if needed, is to crop the data in the frame buffer to obtain the input video data, step 800.

Next, it is determined whether the color-depth of the input frame is larger or smaller than the desired output color depth, step 810. In the present embodiment, a control block may make this determination, and the result of this comparison may be simply sent to a color depth reduction unit.

In one case where the input color depth is larger than the desired output color depth, the input frame of data is dithered to achieve the desired output color depth, step 820. For example, if the input color depth includes 30 bit RGB color (10:10:10), and the desired output color depth is 24 bit RGB color (8:8:8), the color depth of the input frame should be reduced. One method to achieve this is, is to merely take the most significant (MSB) 8 bits from each component (R,G,B) to obtain the 24-bit RGB color (8:8:8). In alternative embodiments of the present invention, other methods of reducing color depth are contemplated. For example, different techniques are typically used when receiving video data in different component spaces, such as YUV, HSV, and the like.

In one case where the input color depth is smaller than the desired output color depth, the input frame of data is typically scaled to the output color depth, step 830. For example, if the input color depth is 8 bits and the desired output bit depth is 10 bits, the input frame bit depth may be scaled up. One method to achieve this upscaling would be to simply use the X number of bits of the input pixel values, as the X number of most significant bits (MSBs) in the desired output color depth. In the example above, the two least significant bits (LSBs) of the output frame may be padded with 0s, 1s or the like. In other embodiments of the present invention, any number of upscaling techniques may also be used.

Next, it is determined whether the resolution of the input frame is larger or smaller than the desired output resolution, step 840. In the present embodiment, a control block may make this determination, and the result of this comparison may be sent to a sampler unit.

In one case where the input resolution is larger than the desired output resolution, the input frame of data is sub-sampled to approximately achieve the desired output resolution, step 850. For example, if the input resolution is 640×480 and the desired output resolution is 320×240, the input frame resolution should be reduced. One method to achieve subsampling would be to use every Xth pixel in every Xth line for the output image. Using the example above, X would be 2, to achieve 320×240 resolution, and the like.

In alternative embodiments of the present invention, other methods of subsampling are contemplated. For example, the average of a number of pixels surrounding a pixel could be used for the output image.

In one case where the input resolution is smaller than the desired output resolution, the input frame of data is super-sampled to approximately achieve the desired output resolution, step 860. For example, if the input resolution is 160×120 and the desired output resolution is 320×240, the input frame resolution should be increased. One method to achieve upscaling would be to use pixel replication techniques. Interpolation techniques using bilinear or bi-cubic filters could be employed to provide a more acceptable image. In still other embodiments of the present invention, any number of upscaling techniques may also be used.

In the present embodiment, it is next determined whether the frame rate of the input frame is greater or lesser than the desired output frame rate, step 870. In the present embodiment, a control block may make this determination, and the result of this comparison may be simply sent to a frame rate reduction unit.

In one case where the frame rate is higher than the desired output frame rate, frames of the input image are dropped, step 880. For example, if the input frame rate is 30 frames per second (fps) and the desired output frame rate is 10 fps, the input frame rate should be reduced. In such an embodiment, two of every three input frames need to be dropped, and the remaining input frame is used for output. Embodiments may include a counting mechanism to identify which frames are to be dropped, or which frames will not be dropped.

In alternative embodiments of the present invention, other methods for adjusting the frame rate are contemplated. For example, instead of dropping frames, frames may be interpolated and output. For example, in the example above, the motion vectors of three frames may be interpolated together to form the motion vectors of one output frame. Other techniques are also contemplated.

In one case where the input frame rate is lesser than the desired output frame rate, frames may be added to the input frames, step 890. For example, if the input frame rate is 5 fps and the desired output frame rate is 10 fps, the number of frames should be increased. One method to add frames simply by duplicating the previous frame. Another method is to add frames is by averaging frames about the added frame. In still other embodiments of the present invention, any number of techniques for adding frames may also be used.

In this embodiment, for non-MPEG encodings, the next step is to determine whether the bit rate of the input frame is greater or lesser than the desired output bit rate, step 900. In the present embodiment, a control block may help make this determination, and/or the result of this comparison may be simply sent to a bit rate control unit. In the present embodiment, the bit rate of a first input image is first determined. This bit rate is compared to the desired bit rate, and in response, a quantization scale factor is determined. This quantization scale factor is then applied to scale the next input image.

In one case where the bit rate is higher than the desired output bit rate, the bit rate of the input image is reduced, step 910. For example, if the input bit rate is 20 kilo bits per second (kbps) and the desired output bit rate is 10 kbps, the input bit rate should be reduced. In such an embodiment, the quantization scale factor is computed based on known statistical algorithms. The next input image is assumed to be approximately the same bit rate (20 kbps), thus it is scaled by 2 to reduce the bit rate to 10 kbps.

In the present embodiment, reducing the bit rate by the scaling factor is accomplished by dynamically reducing the effective bit depth of the DCT data in the frame. For example, the input frame may include pixels having DCT values 1, 2, 3, 4, 5, 6, 9, 10 but the corresponding output pixels, after scaling, may have the respective values 0, 0, 0, 4, 4, 4, 8, 8. As illustrated in this example, the two LSB are ignored, thus there are 4 times fewer output DCT values. The reduction of DCT values thus reduces the number of output bits, and thus reduces the output bit rate.

In alternative embodiments of the present invention, other types of techniques can be used to reduce the output bit rate.

In one case where the input bit rate is less than the desired output bit rate, data may be added to the input frames, step 920. For example, if the input bit rate is 10 kilo bits per second (kbps) and the desired output bit rate is 20 kbps, the input bit rate may be increased. In such an embodiment, the quantization scale factor can then be calculated, as above, and the scale factor can then be applied to the next input frame.

In the present embodiment, increasing the bit rate by the scaling factor is accomplished by dynamically increasing the effective bit depth of the frame. For example, the input frame may include pixels having values 2, 2, 2, 4, 4, 8, 8, 16, 16, (out of 16) but the corresponding output pixels, after scaling, may have the respective values 32, 32, 32, 64, 64, 128, 128, 256, 256 (out of 256). Then the pixels may be averaged with adjacent pixels to obtain a higher quantization level. Other sorts of techniques for increasing the number of bits are contemplated in other embodiments of the present invention.

In the present embodiment, the determination of the quantization scale factor occurs at every frame. The scale factor is then applied to the next frame. In alternative embodiments of the present invention, the quantization scale factor may be recalculated less often, depending upon the type of input video data, the processing power, and the like.

The next step in this example is to determine the data encoding format, step 930. In the present embodiment, a control block may make this determination. Next, in the present embodiment, the data from the bit rate control circuit is input into the appropriate encoding block, step 940.

After encoding the video data stream, the stream may also be encrypted using known cryptographic methods.

In one embodiment of the present invention, the encoding format may include MPEG-1, MPEG-2, MPEG-4, *.avi, *.mov, *.rm, *.aff, and the like. In other embodiments, sub-groups of these formats may only be supported, for example, one system may only provide MPEG-4 and Quicktime encoding. In other embodiments, additional encoding formats, and streaming media formats may also be supported.

One embodiment of an encoder is based primarily upon hardware encoders, however, these encoders may also be implemented by software routines.

Figure 8:
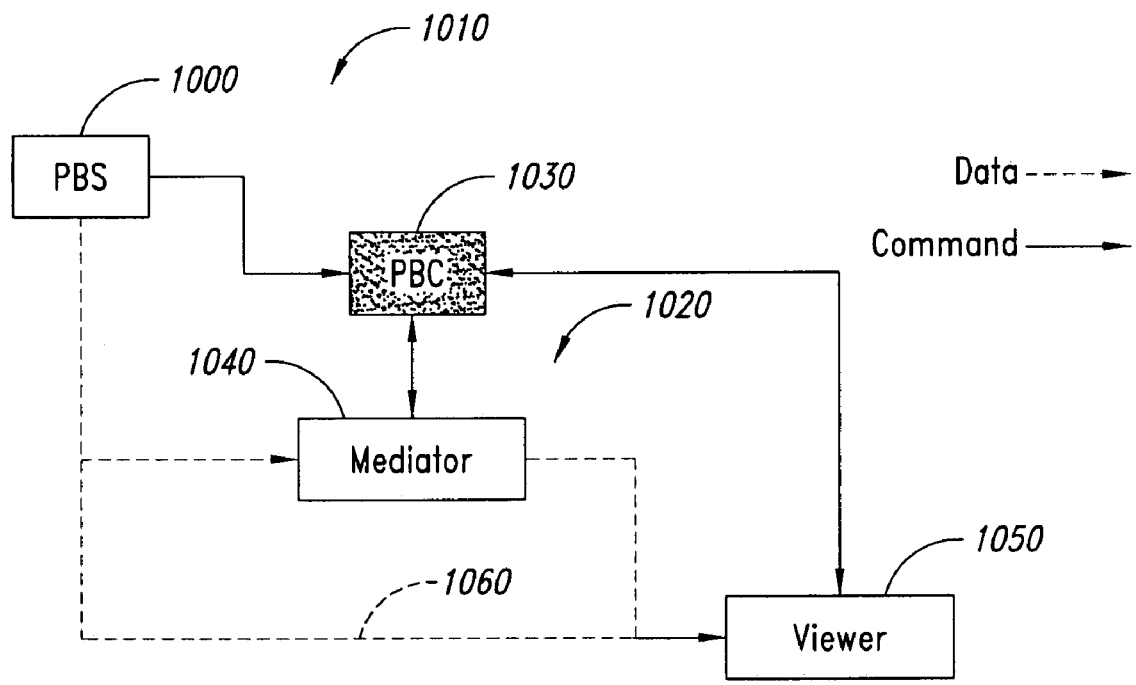
FIG. 8 illustrates a simplified diagram of an embodiment of the present invention.

FIG. 8 illustrates a simplified diagram of an embodiment of the present invention. In FIG. 8, a video source 1000 is illustrated coupled over a network 1010 to a gateway server 1020. Gateway server 1020 includes computer hardware 1030 and software 1040. Gateway server 1020 is coupled to a video requester 1050 (video sink) or media sink.

In one embodiment of the present invention, as discussed above, the viewer requests gateway server 1020 to provide a video stream originating from video source 1000. Software 1040 is used to determine whether gateway server 1020 can provide the requested stream. If not, software 1040 forwards request to video source 1000, and video source 1000 and video requester 1050 then communicate with each other 1060, as described above.

In another embodiment of the present invention, as discussed above, the viewer requests video source 1000 to provide a video stream. If video source 1000 cannot, the request is passed to gateway server 1020. Software 1040 is then used to determine whether gateway server 1020 can provide the requested stream. Gateway server 1020 and video requester 1050 then communicate with each other.

In one embodiment of the present invention, video source is embodied as a Personal Broadcast Server (PBS) as described in the application incorporated herein.

Although not shown, any number of other gateway servers may be provided. In such cases, when both video source 1000 and gateway server 1020 cannot provide the requested video, the request may be redirected to another gateway server. This process may repeat until a gateway server is located that can provide the requested video, or until a pre-determined number of redirections.

Figure 9A:
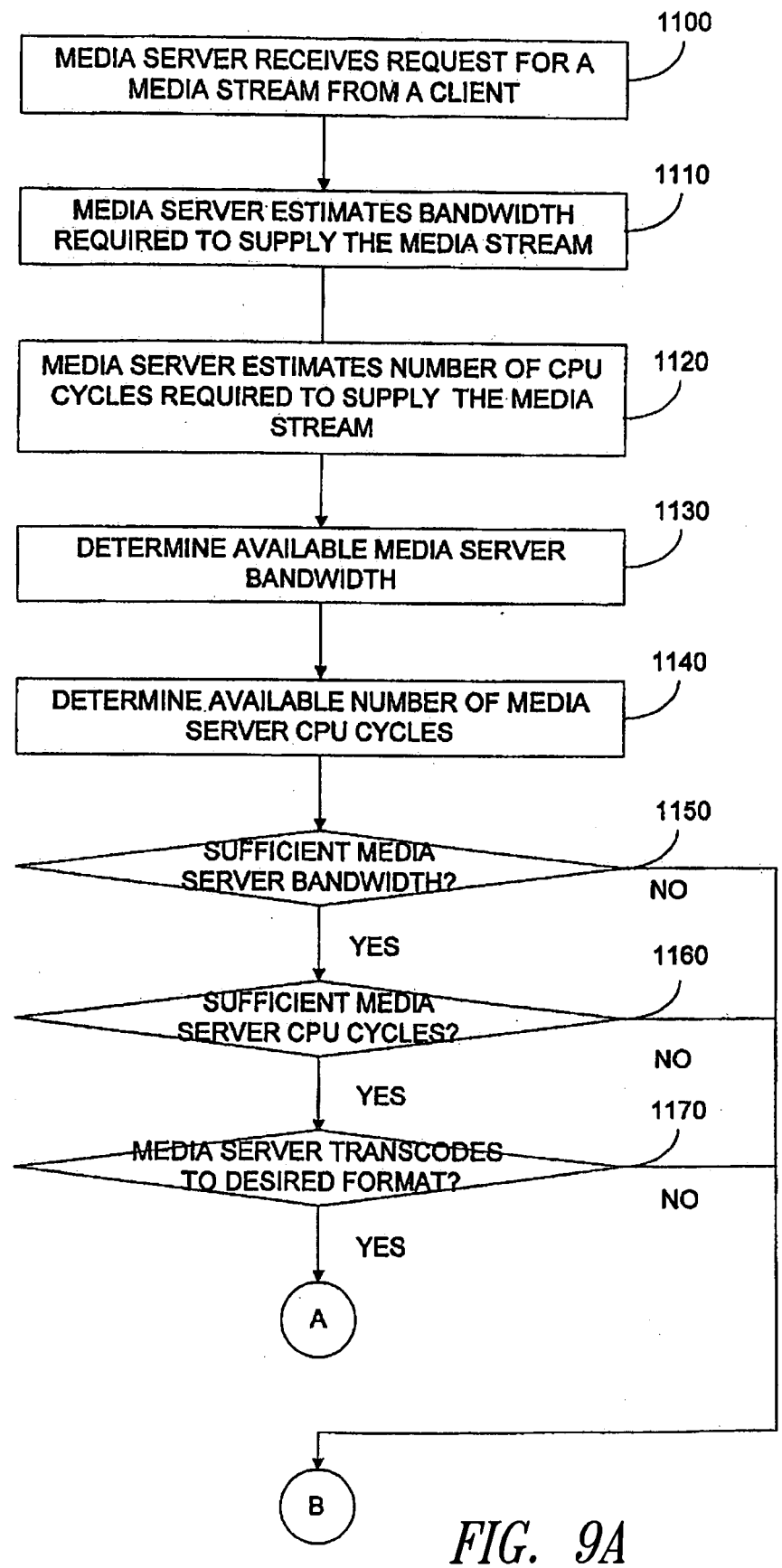
FIGS. 9A–D illustrate a flow diagram according to an embodiment of the present invention.
Figure 9B:
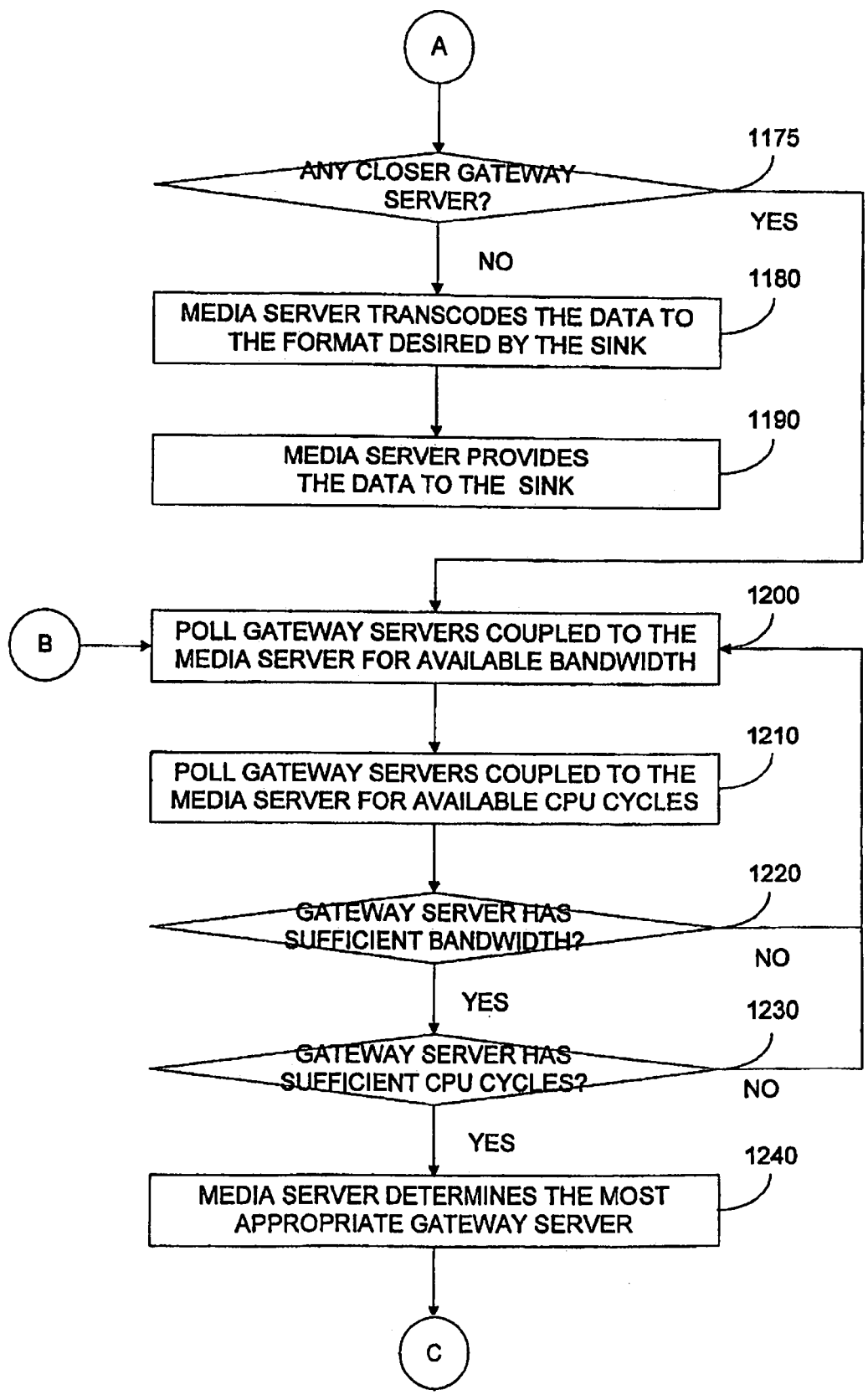
Figure 9C:
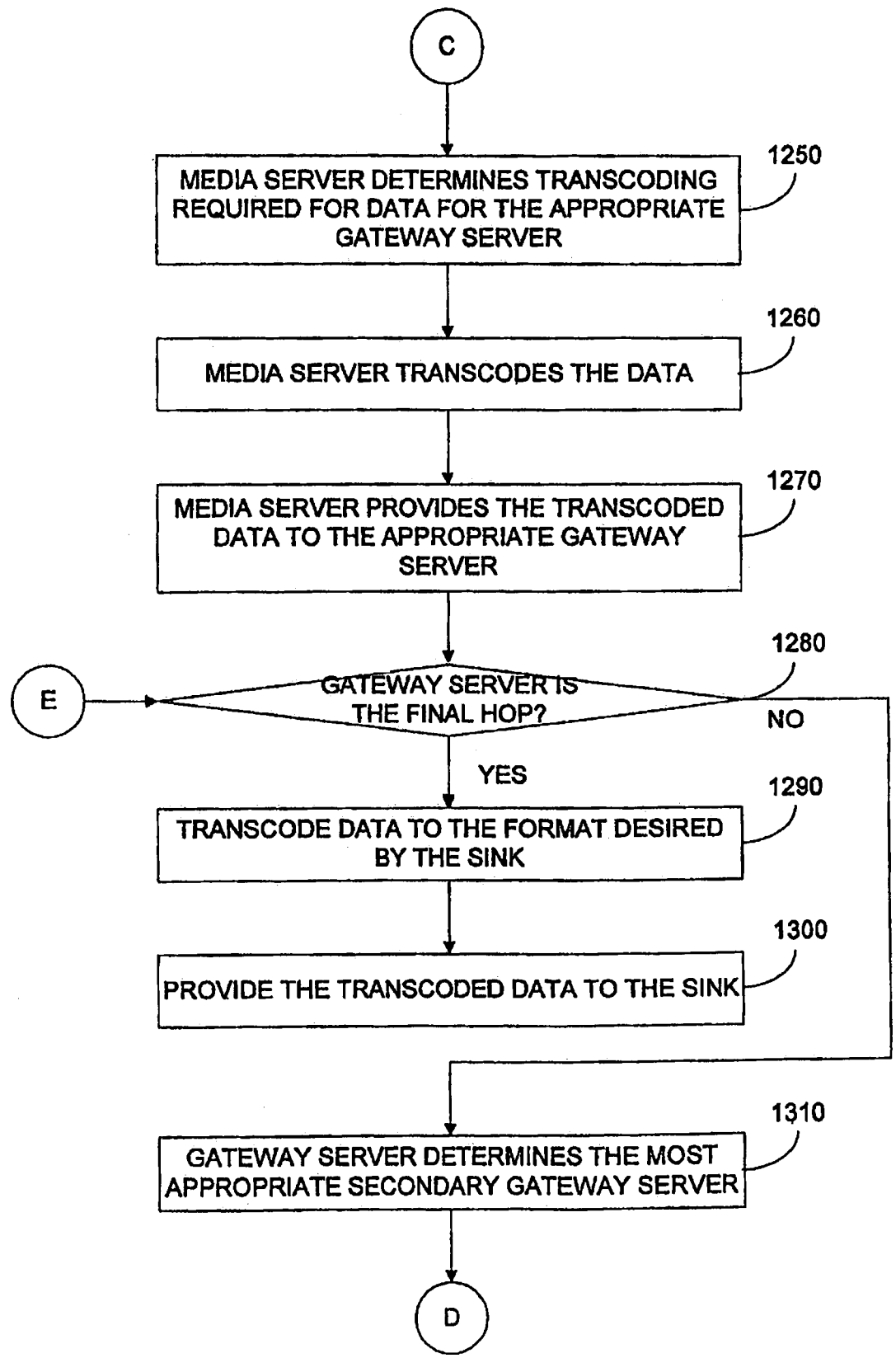
Figure 9D:
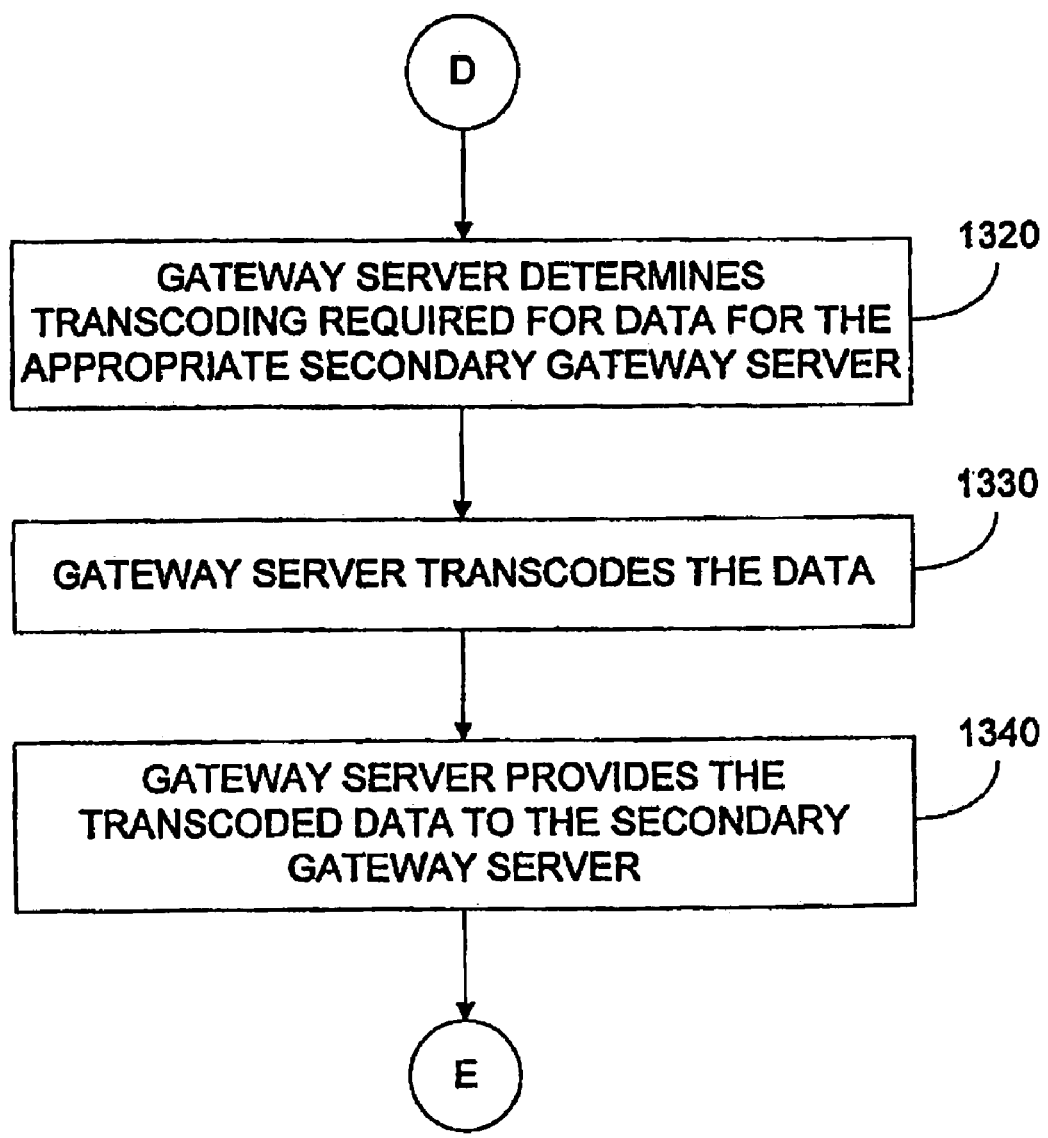

FIGS. 9A–C illustrate a flow diagram according to an embodiment of the present invention. Initially, a client application, such as a web browser, or the like, requests media from a host computer system, step 1100. In this embodiment, the client application may be termed the sink, media sink, or the like; the data requested by the media sink may be termed source media, media file, media data, live data stream, or the like; further, the host computer system that stores or provides the source media may be termed an Origin, a source computer, a media source, a media server, and the like.

In response to the request, the Origin initially determines in the following steps whether it can support the sink request. In other words, the Origin makes a decision on whether to send the data from the Origin to the Sink directly or to send that data to a Re-server (gateway server) which will then send multiple copies or versions to possibly multiple sinks. In one embodiment, such a decision is made upon available bandwidth. In FIGS. 9A–D, the term "bandwidth" refers to the network connection bandwidth, for example T3, 1 Mbits/sec, 384 Kbps and the like.

In this embodiment, the Origin first determines the amount of connection bandwidth required to provide the data to the sink, $B_1$, step 1110, and estimates the amount of CPU processing required to provide the data to the sink, $C_1$, step 1120. The Origin may also know or determine the amount of bandwidth used up by current processes within the Origin, step 1130. Other processes within the Origin may include providing the data to other sinks, $B_{Sinks}$, and providing the data to gateway servers, $B_{S \to G}$. A maximum bandwidth or maximum desired bandwidth that the Origin supports is $B_S$.

The Origin may also know or determine the number of CPU cycles, or the like used up by current processes, step 1140. Other processes may also include providing the data to other sinks, $C_O$, and providing the data to gateway servers, $C_{S \to G}$. A maximum amount or maximum desired amount of CPU processing that the Origin supports is $C_S$.

In response to such data, the Origin determines whether it can provide the data to the media sink based upon the maximum bandwidth of the Origin, step 1150, and based upon the maximum amount of CPU processing the Origin supports, step 1160. In one embodiment, a determination is made whether the following relationships are maintained:

$$B_S \geq B_{S \to G_1} + B_1 + B_{Sinks},$$

$$C_S \geq C_{S \to G_1} + C_1 + C_{Sinks}$$

In one embodiment, the Origin may also determine whether it can transcode the data to the sink in the format desired by the sink, step 1170. For example, if the Origin has the data in an MPEG format and the sink requires the data in an AVI format, it is determined whether the Origin can transcode the data from MPEG to AVI.

In the present embodiment, if the Origin supports the bandwidth and CPU cycles required by the sink, and can transcode to the desired format, the Origin determines whether there are any closer gateway servers to the sink, step 1175. If not, the Origin performs any necessary transcoding, step 1180, and then provides the data to the sink, step 1190.

If the Origin cannot supply the data, or decides it cannot supply the data for any other reason, the Origin then polls each coupled transcoding gateway servers to determine the amount of bandwidth used up by current processes on each gateway server, step 1200. The other processes for each coupled gateway servers may include providing the data to other sinks, $B_{RxSinks}$, providing the data to other gateway servers, $B_{Rx \to G}$. The maximum available or maximum desired bandwidth the other gateway servers, $B_{Rx}$ may also be determined.

In the present embodiment, the Origin polls each coupled gateway servers to determine the number of CPU cycles, or the like used up by current processes, step 1210. The other processes for each coupled gateway server may include providing the data to other sinks, $C_{RxSinks}$, and providing the data to other gateway servers, $C_{Rx \to G}$. A maximum amount or maximum desired amount of CPU processing available of the other gateway servers is $C_{Rx}$.

In response to such data, the Origin determines which coupled gateway servers can provide the data to the media sink based upon the maximum bandwidth of each gateway server, step 1220, and based upon the maximum amount of CPU processing available of each gateway server, step 1230. In one embodiment, a determination is made for each coupled gateway server x whether the following relationships are maintained:

$$B_{Rx} \geq B_{Rx \to G} + B_1 + B_{RxSink},$$

$$C_{Rx} \geq C_{Rx \to G} + C_1 + C_{RxSinks}$$

In one embodiment, the Origin may also determine which gateway servers is most appropriate for to provide the data to the sink in the format desired by the sink, 1240. In one embodiment of the present invention, an appropriate gateway server is one that can transcode data to a form more appropriate for the sink. For example, an Origin provides data having an image resolution of 640×480 to a gateway server, and the format desired by the sink is an image resolution of 80×60. An appropriate gateway server is one that has available processing ability and that can transcode the data from 640×480 to 80×60. In embodiments of the present invention, the abilities of gateway servers may be determined based upon historical data. An example of this will be illustrated below.

In the present embodiment, when the appropriate gateway server is determined, the Origin determines an appropriate transcoding for data to be sent to the gateway server, step 1250. In this example, the sink requires MPEG4 encoded data with an 80×60 resolution. The Origin determines that the appropriate gateway server only transcodes by reducing image resolution, thus that gateway server requires MPEG4 input. Accordingly, the Origin transcodes the data into the appropriate format for the gateway server, step 1260. In the example above, the Origin transcodes data from MPEG1, AVI, or MOV format or the like, into the MPEG4 encoding format. After transcoding, the transcoded data is provided to the gateway server, step 1270.

In the present embodiment, the gateway server initially determines whether it is the closest gateway server to the sink and can provide the data to the sink in the desired format, step 1280. If so, it transcodes data received from the Origin into the desired format, step 1290, and provides the data to the sink, step 1300.

In one embodiment, when other gateway servers are determined to be closer to the sink, the gateway server determines an appropriate secondary gateway server for providing the data, step 1310. In this embodiment, the appropriate secondary gateway server is selected from one-hop gateway servers that have the processing ability and that can transcode data to a form more appropriate for the sink. For example, a gateway server receives data at a bit rate of 1 Mbs and the format desired by the sink is a bit rate of 56 Kbps. An appropriate secondary gateway server is one that has available processing ability and that can transcode the data from 1 Mbps to 56 Kbps. In embodiments of the present invention, the abilities of secondary gateway servers may be determined based upon historical data.

In the present embodiment, when the secondary gateway server is determined, the gateway determines an appropriate transcoding for data to be sent to the secondary gateway server, step 1320. For example, the gateway server may determine that the secondary gateway server only transcodes by reducing bit rate of data to multiple clients at a resolution of 80×60, and thus the secondary gateway server requires low resolution input. Accordingly, the gateway server transcodes the data into the appropriate format for the secondary gateway server, step 1330. In the example above, the Origin may transcode data from an image resolution of 640×480, 320×240, or the like to an image resolution of 80×60. After transcoding, the transcoded data is provided to the secondary gateway server, step 1340.

The process above may then be repeated for the secondary gateway server, and so on, until the data is provided to the sink. More particularly, this process will propagate until requests by different sinks are consolidated into a handful of request from the one hop gateways from the sending device to the sending device. These decision are dynamically controlled by the new sinks tuning into the multimedia content or existing sinks tuning out. Such information may affect the decisions made by the nearest gateway and the changes will be propagated, if necessary, all the way to the sending device.

Figure 10:
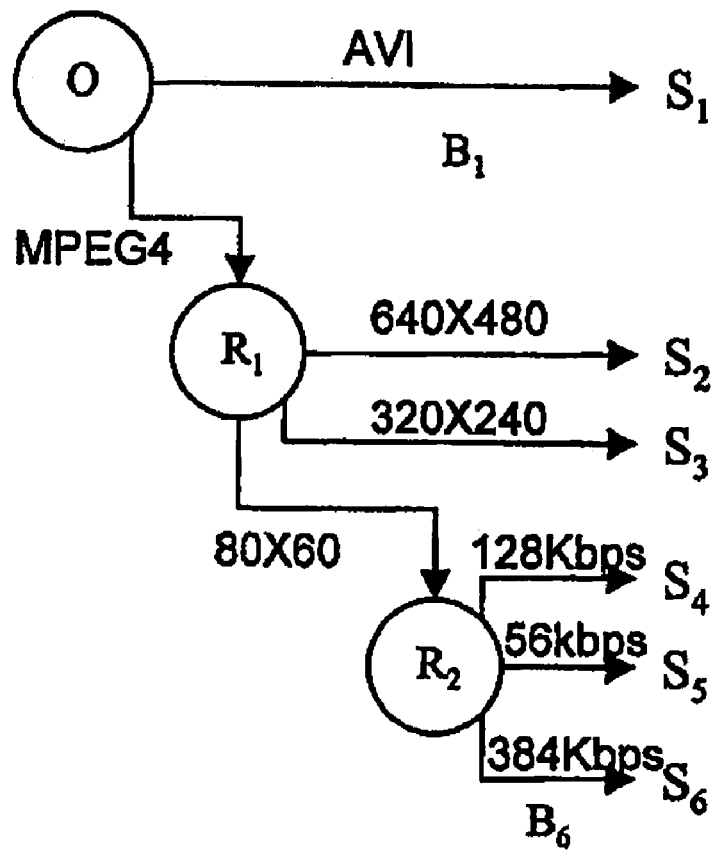
FIG. 10 illustrates an example of application of an embodiment of the present invention.

FIG. 10 illustrates an example of application of an embodiment of the present invention. In this example, the Origin O stores a source media in the MPEG2 encoding format at 800×600 resolution and can transcode to different encoding formats; Re-server (gateway server) R1 transcodes to different image resolutions, and gateway server R2 transcodes to different bit rates.

In this example, a sink S1 customer wants to view the source media in the AVI encoding format, and S1 is the closer to the Origin than to other gateway servers. Accordingly, since the Origin has sufficient processing ability, it performs the transcoding to the AVI encoding format and provides the source media to sink S1.

Next, a sink S2 customer wants to view the source media in the MPEG4 encoding at 640×480 resolution. In this case, if the Origin has insufficient processing ability or the Origin cannot transcode from 800×600 resolution, thus the Origin may locate a one-hop gateway server such as R1. The Origin may know that gateway server R1 can transcode resolution but not encoding format. The Origin thus determines that the appropriate transcoding of data to gateway server R1 is transcoding the data to the MPEG4 encoding format. After the Origin encodes the source media in MPEG4, the Origin sends the data to gateway server R1.

Gateway server R1 then determines that it should provide the MPEG4 directly to sink S2. In such a case, gateway server R1 transcodes the source media from 800×600 resolution to 640×480 resolution, and then provides this data to the sink S2.

Later, the Origin may receive a request from a sink S4 to view the source media in the MPEG4 encoding at 80×60 resolution, with a bit rate of 128 Kbps. Since sink S2, is currently being provided with MPEG4 data from gateway server R1, the Origin may efficiently or automatically pass the request from sink S4 to gateway server R1. In turn, gateway server R1 identifies a gateway server R2 that can reducing the data bit rate of the source media. In this example, gateway server R1 determines that gateway server R2 only requires data at 80×60 image resolution, thus gateway server R1 transcodes and reduces the image resolution. Gateway server R1 then provides the reduced resolution data to gateway server R2. Gateway server R2 transcodes the data to a 128 Kpbs stream, and then delivers the stream to sink S4.

Next, the Origin may receive a request from a sink S5 to view the source media in the MPEG4 encoding at 80×60 resolution, with a bit rate of 56 Kbps. Since sink S2, is currently being provided with MPEG4 data from gateway server R1, the Origin may efficiently or automatically pass the request from sink S4 to gateway server R1. Since sink S4, is currently being provided with data from gateway server R2, gateway server R2 may efficiently or automatically pass the request from sink S5 to gateway server R2. In this example, R2 then reduces the bit rate of the source media to 56 Kbps and then provides the source media to sink S5.

Subsequent requests made to a gateway server will thus be propagated through the network through hops of gateways until it reaches the sending device. As illustrated above, each gateway server (based on all of the requests that have been made to it) keeps track of the list of gateways or consumers who have requested a certain type of information stream. These gateways use the above mentioned decision making logic to determine the optimal gateway to make its request to and the optimal format/properties for the stream it will request.

In the foregoing specification, the invention has been described with reference to specific exemplary embodiments thereof. Many changes or modifications are readily envisioned. For example, the deployment of these transcoding gateways can also be used to optimize the delivery of archived media and other traditional content such as images or text as well. Caching techniques can be employed on the gateways to minimize the path between the information and the consumer. The transcoding will be effective on archived media and optimize the delivery of such information as is possible.

The foregoing description of preferred embodiments of the present invention has been provided for the purposes of illustration and description. It is not intended to be exhaustive or to limit the invention to the precise forms disclosed. Obviously, many modifications and variations will be apparent to the practitioners skilled in this art.

The embodiments were chosen and described in order to best explain the principles of the invention and its practical application, thereby enabling others skilled in the art to understand the invention for various embodiments and with various modifications as are suited to the particular use contemplated. It is intended that the scope of the invention be defined by the following claims and their equivalents.

What is claimed is:

1. A method for an origin server, comprising:
   polling a first plurality of one-hop gateway servers for available bandwidth for each respective one-hop gateway server;
   polling the first plurality of one-hop gateway servers for available number of CPU cycles for each respective one-hop gateway server;
   receiving a request in the origin server to provide data to a media sink in a desired format;
   determining a bandwidth requirement for servicing the media sink;
   determining an estimated number of CPU cycles required for servicing the media sink;
   determining a second plurality of one-hop gateway servers from the first plurality of one-hop gateway servers, which includes determining which one-hop gateway servers from the second plurality of one-hop gateway servers have an available bandwidth greater or equal to the bandwidth requirement for servicing a sink and an available number of CPU cycles greater or equal to the estimated number of CPU cycles for servicing the media sink;
   determining a one-hop gateway server from the second plurality of one-hop gateway servers appropriate for providing the data to the media sink in the desired format, the one-hop gateway server from the second plurality of one-hop gateway servers being configured to receive data in a certain format;
   providing the one-hop gateway server from the second plurality of one-hop gateway servers with the data in the certain format; and
   transcoding the data from the certain format to the desired format.

2. The method of claim 1 wherein the number of CPU cycles available from the one-hop gateway server from the second plurality of one-hop gateway servers are greater or equal to numbers of CPU cycles available of other one-hop gateway servers from the second plurality of one-hop gateway servers.

3. The method of claim 1, further comprising directing the one-hop gateway server from the second plurality of one-hop gateway servers to provide the data to the media sink in the desired format.

4. The method of claim 1, further comprising determining whether the origin server has an available bandwidth greater or equal to the bandwidth requirement for servicing the media sink and an available number of CPU cycles greater or equal to the estimated number of CPU cycles for servicing the media sink, wherein providing the one-hop gateway server from the second plurality of one-hop gateway servers with the data in the certain format comprises providing that one-hop gateway server with the data when the origin server has insufficient available bandwidth for servicing the media sink.

5. The method of claim 1 wherein providing the one-hop gateway server from the second plurality of one-hop gateway servers with the data in the certain format comprises providing the one-hop gateway server from the second plurality of one-hop gateway servers with the data in the certain format when it is determined that the origin server is farther from the media sink than the one-hop gateway server.

6. The method of claim 1 wherein the desired format comprises characteristics selected from desired bit rate, desired bit depth, desired encoding format, desired image size, desired frame rate.

7. The method of claim 6 wherein the desired encoding format is selected from the group: MPEG, AVI, MOV.

8. A gateway server comprises:
a processor; and
a tangible memory coupled to the processor, the tangible memory including:
code that directs the processor to detect a request to provide a source media to a media sink in a specified format;
code that directs the processor to poll a plurality of one-hop gateway servers for available bandwidth for one-hop gateway server coupled to the gateway server;
code that directs the processor to determine a bandwidth requirement for providing the source media to the media sink;
code that directs the processor to determine whether a one-hop gateway server from the plurality of one-hop gateway servers has an available bandwidth greater or equal to the bandwidth requirement for providing the source media;
code that directs the processor to receive the source media in a first format;
code that directs the processor to determine a second format for the source media, the second format appropriate for the one-hop gateway server;
code that directs the processor to transcode the source media from the first format into the second format; and
code that directs the processor to provide the source media in the second format to the one-hop gateway server.

9. The gateway server of claim 8 wherein the tangible memory also includes:
code that directs the processor to determine whether the gateway server has an available bandwidth greater or equal to the bandwidth requirement for providing the source media;
wherein the code that directs the processor to provide the source media in the format to the one-hop gateway server comprises code that directs the processor to provide the source media in the format to the one-hop gateway server when the gateway server has insufficient available bandwidth for providing the source media.

10. The gateway server of claim 9 wherein the code that directs the processor to provide the source media in the second format comprises code that directs the processor to provide the source media in the second format when the one-hop gateway server is configured to transcode the source media to the specified format.

11. The gateway server of claim 8 wherein the tangible media also includes code that directs the processor to determine whether the one-hop gateway server is closer to the media sink than the gateway server,
wherein code that directs the processor to provide the source media in the second format to the one-hop gateway server comprises code that directs the processor to provide the source media in the second format to the one-hop gateway server when the one-hop gateway server is closer to the media sink than the gateway server.

12. The gateway server of claim 8 wherein the tangible media also includes:
code that directs the processor to poll the one-hop gateway server for available CPU cycles;
code that directs the processor to determine an approximate number of CPU cycles required to provide the source media to the media sink; and
code that directs the processor to determine whether the available CPU cycles is greater than the approximate number of CPU cycles required to provide the source media to the media sink.

13. The gateway server of claim 8 wherein the code that directs the processor to transcode the source media from the first format into the second format comprises code that converts characteristics of the source media selected from the group: bit rate, bit depth, encoding format, image size, frame rate.

14. The gateway server of claim 13 wherein the encoding format is selected from the group: MPEG, AVI, MOV.

15. A computer program product comprising a computer readable medium encoded with instructions for a gateway server including a processor comprises:
a tangible memory coupled to the processor, the tangible memory including:
code that directs the processor to detect a request to provide a source media to a media sink in a specified format;
code that directs the processor to poll a plurality of one-hop gateway servers for available processing ability for each respective one-hop gateway server coupled to the media source;
code that directs the processor to determine a processing requirement for providing the source media to the media sink;
code that directs the processor to determine whether a one-hop gateway server from the plurality of one-hop gateway servers that has an available processing ability greater or equal to the processing requirement for providing the source media;
code that directs the processor to determine a format for the source media appropriate for the one-hop gateway server;
code that directs the processor to transcode the source media into the format; and
code that directs the processor to provide the source media in the format to the one-hop gateway server.

16. The computer program product of claim 15 wherein the processing ability is selected from the class: network connection bandwidth, available CPU processing.

17. The computer program product of claim 15 wherein the code that directs the processor to provide the source media in the format comprises code that directs the processor to provide the source media in the format when the one-hop gateway server is configured to transcode the source media from the format to the specified format.

18. The computer program product of claim 15 wherein the tangible memory also includes code that directs the processor to determine whether the one-hop gateway server is closer to the media sink than the gateway server,
wherein code that directs the processor to provide the source-media in the format to the one-hop gateway server comprises code that directs the processor to provide the source media in the format to the one-hop gateway server when the one-hop gateway server is closer to the media sink than the gateway server.

19. The computer program product of claim 18 wherein the tangible memory also includes code directs the processor to provide the source media in the desired format to the media sink when the gateway server is closer to the media sink than the one-hop gateway server.

20. The computer program product of claim 15 wherein the tangible memory also includes code that directs the processor to receive the source media in a received format,
wherein code that directs the processor to transcode the source media comprises code that directs the processor to transcode the source media from the received format into the format.

* * * * *

UNITED STATES PATENT AND TRADEMARK OFFICE
CERTIFICATE OF CORRECTION

PATENT NO.         : 6,981,045 B1                                          Page 1 of 1
APPLICATION NO. : 09/789715
DATED              : December 27, 2005
INVENTOR(S)        : Roger K. Brooks It is certified that error appears in the above-identified patent and that said Letters Patent is hereby corrected as shown below:

<u>Title Page & Column 1, line, 1:</u>
Item (54) should read as
-- SYSTEM AND METHOD FOR REDIRECTING REQUESTS FOR DATA TO SERVERS HAVING SUFFICIENT PROCESSING POWER TO TRANSCODE STREAMS OF DATA INTO A DESIRED FORMAT --

Signed and Sealed this

Twenty-second Day of August, 2006

JON W. DUDAS
*Director of the United States Patent and Trademark Office*